US010565722B1

(12) United States Patent
Baker

(10) Patent No.: US 10,565,722 B1
(45) Date of Patent: Feb. 18, 2020

(54) TECHNIQUES FOR DETERMINING A THREE-DIMENSIONAL REPRESENTATION OF A SURFACE OF AN OBJECT FROM A SET OF IMAGES

(71) Applicant: Henry Harlyn Baker, Los Altos, CA (US)

(72) Inventor: Henry Harlyn Baker, Los Altos, CA (US)

( * ) Notice: Subject to any disclaimer, the term of this patent is extended or adjusted under 35 U.S.C. 154(b) by 0 days.

(21) Appl. No.: 15/986,736

(22) Filed: May 22, 2018

Related U.S. Application Data

(63) Continuation of application No. 14/887,462, filed on Oct. 20, 2015, now Pat. No. 10,008,027.

(60) Provisional application No. 62/066,321, filed on Oct. 20, 2014.

(51) Int. Cl.
| | |
|---|---|
| *G06K 9/00* | (2006.01) |
| *G06T 7/70* | (2017.01) |
| *G06T 7/13* | (2017.01) |
| *G06T 7/50* | (2017.01) |
| *G06T 7/593* | (2017.01) |

(52) U.S. Cl.
CPC ............ *G06T 7/70* (2017.01); *G06T 7/13* (2017.01); *G06T 7/50* (2017.01); *G06T 7/593* (2017.01); *G06T 2207/10012* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 5,359,362 A | 10/1994 | Lewis et al. | |
| 5,613,048 A | 3/1997 | Chen et al. | |
| 5,710,875 A | 1/1998 | Harashima et al. | |
| 5,764,236 A | 6/1998 | Tanaka et al. | |
| 5,852,672 A * | 12/1998 | Lu ..................... | G01B 11/2441 |
| | | | 382/154 |

(Continued)

OTHER PUBLICATIONS

Baker, H. Harlyn and Robert C. Bolles, "Generalizing Epipolar-Plane Image Analysis on the Spatiotemporal Surface", International Journal of Computer Vision, 3, 33-49 (1989).

(Continued)

*Primary Examiner* — Iman K Kholdebarin
(74) *Attorney, Agent, or Firm* — Marc P. Schuyler

(57) ABSTRACT

Systems and methods of the present disclosure can facilitate determining a three-dimensional surface representation of an object. In some embodiments, the system includes a computer, a calibration module, which is configured to determine a camera geometry of a set of cameras, and an imaging module, which is configured to capture spatial images using the cameras. The computer is configured to determine epipolar lines in the spatial images, transform the spatial images with a collineation transformation, determine second derivative spatial images with a second derivative filter, construct epipolar plane edge images based on zero crossings of second derivative epipolar planes image based on the epipolar lines, select edges and compute depth estimates, sequence the edges based on contours in a spatial edge image, filter the depth estimates, and create a three-dimensional surface representation based on the filtered depth estimates and the original spatial images.

20 Claims, 31 Drawing Sheets

(56) References Cited

U.S. PATENT DOCUMENTS

| | | | |
|---|---|---|---|
| 5,937,105 A | | 8/1999 | Katayama et al. |
| 5,963,664 A | * | 10/1999 | Kumar ............... G06K 9/32 382/154 |
| 6,191,808 B1 | | 2/2001 | Katayama et al. |
| 6,990,228 B1 | * | 1/2006 | Wiles ............... G06T 17/10 345/419 |
| 7,142,726 B2 | * | 11/2006 | Ziegler ............... G06T 17/10 382/285 |
| 9,113,043 B1 | * | 8/2015 | Kim ............... G09G 5/00 |
| 9,674,506 B2 | * | 6/2017 | Tian ............... G06T 5/005 |
| 10,008,027 B1 | | 6/2018 | Baker |
| 2003/0072483 A1 | * | 4/2003 | Chen ............... G06K 9/32 382/154 |
| 2012/0019530 A1 | * | 1/2012 | Baker ............... G02B 27/2207 345/419 |
| 2014/0152647 A1 | * | 6/2014 | Tao ............... G06T 7/557 345/419 |
| 2014/0328535 A1 | * | 11/2014 | Sorkine-Hornung ..... G06T 5/00 382/154 |
| 2015/0279043 A1 | * | 10/2015 | Bakhtiari ............ G06K 9/4642 382/195 |
| 2015/0304634 A1 | * | 10/2015 | Karvounis ........... H04N 13/239 348/46 |
| 2015/0381966 A1 | * | 12/2015 | Tian ............... G06T 5/005 348/47 |

OTHER PUBLICATIONS

Berent, Jesse, and Pier Luigi Dragotti. "Plenoptic Manifolds—Exploiting structure and coherence in multiview images." IEEE Signal Processing Magazine, Nov. 2007.

Berent, Jesse, and Pier Luigi Dragotti. "Segmentation of epipolar-plane image volumes with occlusion and disocclusion competition." Multimedia Signal Processing, 2006 IEEE 8th Workshop on. IEEE, 2006.

Bishop, Tom E., and Paolo Favaro. "Full-resolution depth map estimation from an aliased plenoptic light field." Computer Vision—ACCV 2010. Springer Berlin Heidelberg, 2011. 186-200.

Bolles, Robert C., H. Harlyn Baker, and David H. Marimont, "Epipolar-Plane Image Analysis: An Approach to Determining Structure from Motion", International Journal of Computer Vision, I, 7-55 (1987).

Criminisi, Antonio, Jamie Shotton, Andrew Blake, and Philip HS Torr. "Gaze manipulation for one-to-one teleconferencing." in Computer Vision, 2003. Proceedings. Ninth IEEE International Conference on, pp. 191-198. IEEE, 2003.

Criminisi, Antonio, et al. "Extracting layers and analyzing their specular properties using epipolar-plane-image analysis." Computer vision and image understanding 97.1 (2005): 51-85.

Dansereau, Don, and Len Bruton. "Gradient-based depth estimation from 4d light fields." Circuits and Systems, 2004. ISCAS'04. Proceedings of the 2004 International Symposium on. vol. 3. IEEE, 2004.

Diebold, M., O. Blum, M. Gutsche, S. Wanner, C. Garbe, H. Baker, and B. Jahne. "Light-field camera design for high-accuracy depth estimation." In SPIE Optical Metrology, pp. 952803-952803. International Society for Optics and Photonics, 2015.

Ishibashi, Takashi, et al. "3D space representation using epipolar plane depth image." Picture Coding Symposium (PCS), 2010. IEEE, 2010.

Kang, Sing Bing, Richard Szeliski, and Jinxiang Chai. "Handling occlusions in dense multi-view stereo." Computer Vision and Pattern Recognition, 2001. CVPR 2001. Proceedings of the 2001 IEEE Computer Society Conference on. vol. 1. IEEE, 2001.

Katayama, Akihiro, Koichiro Tanaka, Takahiro Oshino, and Hideyuki Tamura. "Viewpoint-dependent stereoscopic display using interpolation of multiviewpoint images." In IS&T/SPIE's Symposium on Electronic Imaging: Science & Technology, pp. 11-20. International Society for Optics and Photonics, 1995.

Kawasaki, Hiroshi, et al. "Enhanced navigation system with real images and real-time information." ITSWC'01 (2001).

LV, Huijin, et al. "Light field depth estimation exploiting linear structure in EPI" Multimedia & Expo Workshops (ICMEW), 2015 IEEE International Conference on. IEEE, 2015.

Madanayake, Arjuna, et al. "VLSI architecture for 4-D depth filtering." Signal, Image and Video Processing 9.4 (2013): 809-818.

Matousek, Martin, Tomcs Werner, and Vaclav Hlavac. "Accurate correspondences from epipolar plane Images." Proc. Computer Vision Winter Workshop. 2001.

Mellor, J. P., Seth Teller, and Tomas Lozano-Perez. "Dense depth maps from epipolar images." (1996).

Seitz, Steven M., and Jiwon Kim. "The space of all stereo images." International Journal of Computer Vision 48.1 (2002): 21-38.

Tao, Michael W., Sunil Hadap, Jitendra Malik, and Ravi Ramamoorthi. "Depth from Combining Defocus and Correspondence Using Light-Field Cameras." In Computer Vision (ICCV), 2013 IEEE International Conference on, pp. 673-680. IEEE, 2013.

Wanner, Sven, and Bastian Goldluecke. "Spatial and angular Variational super-resolution of 4D light fields." In Computer Vision-ECCV 2012, pp. 608-621. Springer Berlin Heidelberg, 2012.

Wanner, Sven, and Bastian Goldluecke. "Globally consistent depth labeling of 4D light fields." Computer Vision and Pattern Recognition (CVPR), 2012 IEEE Conference on. IEEE, 2012.

Wanner, Sven, and Bastian Goldluecke. "Variational light field analysis for disparity estimation and super-resolution." Pattern Analysis and Machine Intelligence, IEEE Transactions on 36.3 (2014): 606-619.

Wanner, Sven, Janis Fehr, and Bernd Jahne. "Generating EPI representations of 4D light fields with a single lens focused plenoptic camera." Advances in Visual Computing. Springer Berlin Heidelberg, 2011. 90-101.

Wanner, Sven, Christoph Straehle, and Bastian Goldluecke. "Globally consistent multi-label assignment on the ray space of 4d light fields." Computer Vision and Pattern Recognition (CVPR), 2013 IEEE Conference on. IEEE, 2013.

Wanner, Sven, and Bastian Goldluecke. "Reconstructing reflective and transparent surfaces from epipolar plane images." Pattern Recognition. Springer Berlin Heidelberg, 2013. 1-10.

Zheng, Jiang Yu. "Acquiring 3-D models from sequences of contours." Pattern Analysis and Machine Intelligence, IEEE Transactions on 16.2 (1994): 163-178.

Zhu, Zhigang, Guangyou Xu, and Xueyin Lin. "Efficient Fourier-based approach for detecting orientations and occlusions in epipolar plane images for 3D scene modeling." International journal of computer vision 61.3 (2005): 233-258.

T. Wang, A. A. Efros and R. Ramamoorthi, "Depth Estimation with Occlusion Modeling Using Light-Field Cameras," in IEEE Transactions on Pattern Analysis and Machine Intelligence, vol. 38, No. 11, pp. 2170-2181, Nov. 1, 2016.

* cited by examiner

FIG. 6

TECHNIQUES FOR DETERMINING A THREE-DIMENSIONAL REPRESENTATION OF A SURFACE OF AN OBJECT FROM A SET OF IMAGES

CROSS-REFERENCE TO RELATED APPLICATIONS

This application is a continuation of U.S. patent application Ser. No. 14/887,462, filed on Oct. 20, 2015 on behalf of inventor Henry Harlyn Baker; U.S. patent application Ser. No. 14/887,462 in turn claims the benefit of U.S. Provisional Patent Application No. 62/066,321, filed on behalf of inventor Henry Harlyn Baker. Each of the foregoing patent applications is hereby incorporated by reference.

TECHNICAL FIELD

The present disclosure generally relates to determining geometric information (e.g., three-dimensional information) from a set of images.

BACKGROUND

Stereo geometry reconstruction in image processing can be done using two images from two perspectives. Determining correspondence from two views has probabilistic uncertainties, is prone to error and, being based on search, is computationally expensive. Since two views provide no statistical redundancy to facilitate accuracy and precision in estimation, binocular stereo processing leads to solutions that do not satisfy quality requirements for scenes exhibiting complexity. The present disclosure describes systems and methods to utilize redundancy to reduce uncertainty, reduce errors, reduce computational expense, increase accuracy and precision, and increase the quality of solutions.

The results of stereo image processing can be point clouds, which are sets of independent single estimates in three-dimensional space. Point cloud representations lead to scene descriptions that are disjoint, statistically noisy, and not representative of the smooth and continuous nature of our world or the objects in it. Processing point clouds with an averaging and filtering process to derive more continuous descriptions can result in errors, since it is not based on real world constraints. The present disclosure describes systems and methods for representing the results of stereo image processing using connected elements that provide a description of the relationship between estimates and their neighbors in three-dimensional space that is representative of the smooth and continuous nature of the world and the objects in it.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 6 is an illustrative block diagram of an embodiment of a two-dimensional second derivative filter.

Like reference numbers and designations in the various drawings indicate like elements.

DETAILED DESCRIPTION

Figure 1A:
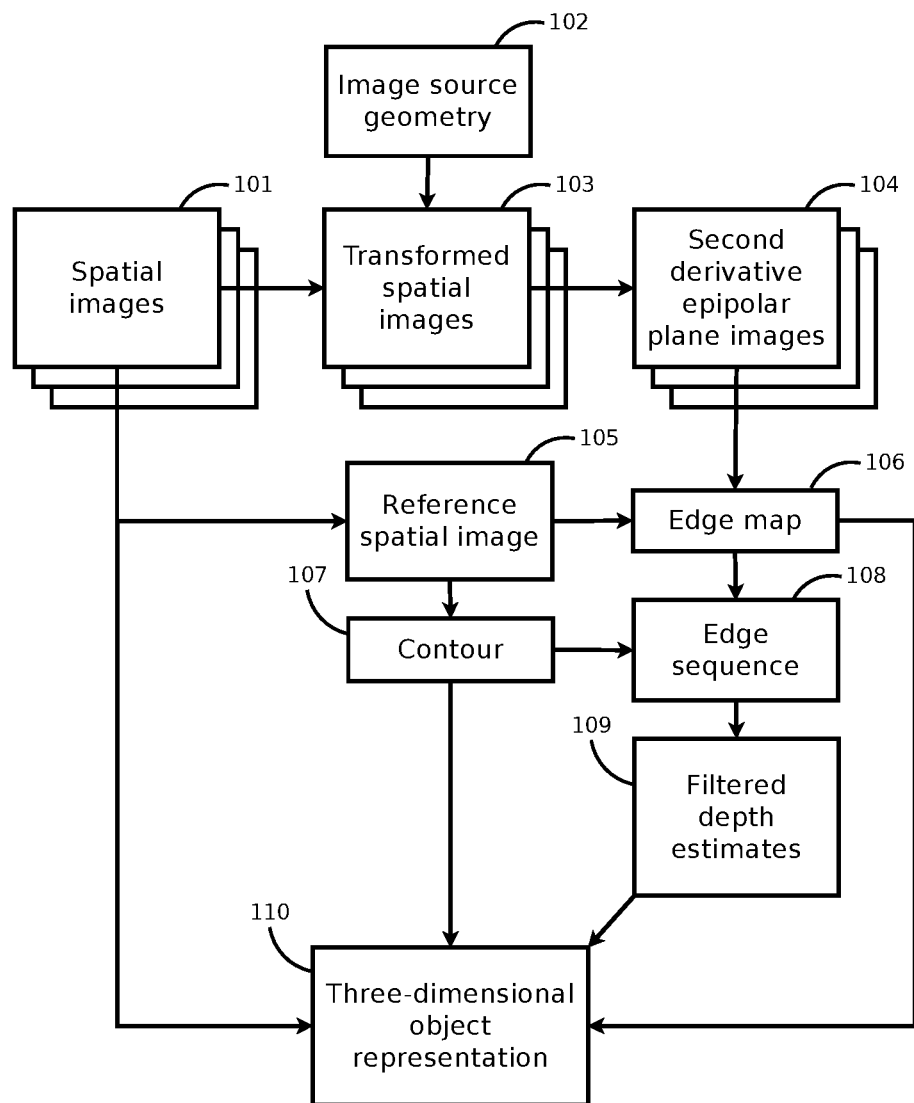
FIG. 1A is an illustrative block diagram of an embodiment of a system for determining a three-dimensional representation of a surface of an object from a set of images.

Systems and methods of the present disclosure can facilitate the acquisition of range information from a set of images, for example, from video images. A multi-imager camera system can deliver 3D-surround range video in various configurations covering azimuth and elevation angles. The camera system may include a large number of cameras, special constraints, special relationships among the components, and a method for processing the data that exploits these many cameras, the constraints and the relationships.

Systems and methods of the present disclosure can facilitate accurate and precise estimates of range without search. As an illustrative example, the characteristic of inexpensive acquisition of high quality range information in various angles up to 360 degrees, which may be derived from exploiting the smoothness and continuity of observation enabled with dense camera placement, may facilitate robust autonomous navigation, enhanced 3D cinema, surveillance augmented with range information, and extended viewpoint interpolation for immersive experiences, entertainment, and interaction.

Embodiments of the present disclosure benefit from advances in camera design, which are driven by the popularity of mobile devices and smartphones, which are making cameras smaller and less expensive. Embodiments of the present disclosure also benefit from advances in computing hardware, which enable control of larger number of cameras and process the images from the cameras more quickly.

Systems and methods of the present disclosure use multi-image capture within the Epipolar-Plane Imaging (EPI) paradigm. EPI can structure image capture so that linear filtering or related linear operations on abstracted data can allow estimation of scene range. EPI requires a set of cameras arranged along a straight line viewing a scene.

Multiple cameras are employed for ranging since one camera can indicate direction but not range, and two cameras can provide triangulation information for ranging but with no statistical redundancy to evaluate accuracy. Three or more observation perspectives can provide a statistical basis for increasing the accuracy and precision of estimation.

Since at least two views may be required for range computation using techniques such as triangulation, a solution employing more views can be called "redundant", meaning that it has more observations than are minimally required. Statistically, this can be referred to as "over-determined." An over-determined solution can utilize its model in applying statistical means to perform outlier rejection and error-minimization in validating its analysis. EPI utilizes over-determined or "redundant" imaging where its over-determined model can arise from the expectation of camera center-of-projection linearity and co-planarity At least one aspect of the present disclosure is directed to a system for creating a three-dimensional representation of an object. In some embodiments, the system includes a computer, one or more processors, an imaging interface, one or more frame buffers, a display, a memory, a storage unit, a user interface, a three-dimensional object model storage, and a three-dimensional object model display. The computer is configured to create, based on a known geometry of a set of image sources and a set of spatial images from the sources, a set of transformed spatial images. The computer is configured to create, based on the set of transformed spatial images, a set of second derivative epipolar plane images. The computer is configured to select a reference spatial image from the set of spatial images. The computer is configured to map a set of selected edges in the second derivative epipolar plane images to edges in the reference spatial image. The computer is configured to select a sequence of the selected edges that map to a contour in the reference spatial image, ordered by the contour. The computer is configured to compute filtered depth estimates associated with the edges in the sequence. The computer is configured to create a three-dimensional representation of an object, based on the depth estimates, the contour, the mapping, and the set of spatial images.

'In some embodiments, the computer is configured to create the set of second derivative epipolar plane images from the 2D second derivative of the set of spatial images.

In some embodiments, the computer is configured to create the set of transformed spatial images with a collineation transformation.

In some embodiments, the computer is configured to select the edges in the set of second derivative epipolar plane images as those that represent a single image feature in the spatial images based on membership of the edges in a contour traced in a second derivative of the epipolar plane images.

At least one aspect of the present disclosure is directed to a system for determining a three-dimensional representation of a surface of an object. In some embodiments, the system includes a computer, a memory, and an imaging module including a set of collinear cameras. The computer is configured to capture a redundant set of spatial images using a set of cameras, each spatial image including a representation of a subset of the object. The computer is configured to use known camera geometry to determine an epipolar line in each spatial image that lies in the same epipolar plane containing a feature on the object. The computer is configured to apply a spatial collineation transformation, based on the known camera geometry, to the redundant set of spatial images to create a set of transformed spatial images. The computer is configured to apply a second derivative filter to the set of transformed spatial images to create a set of second derivative spatial images. The computer is configured to construct second derivative epipolar plane images using the values in the set of second derivative images along the epipolar lines in each spatial image as values along parallel lines in the second derivative epipolar plane images. The computer is configured to calculate interpolated zero crossings in the second derivative epipolar plane images to form epipolar plane edge images. The computer is configured to select edges in the epipolar plane edge images that represent a single image feature in the redundant set of spatial images. The computer is configured to compute depth estimates associated with the selected edges in the epipolar plane edge images. The computer is configured to select a reference second derivative spatial image. The computer is configured to calculate interpolated zero crossings in the reference second derivative spatial image to form a reference spatial edge image. The computer is configured to map the selected edges in the epipolar plane edge images to edges in the reference spatial edge image. The computer is configured to identify contours in the reference spatial edge image. The computer is configured to collect a sequence of the selected edges in the epipolar plane edge images that map to the same contour in the reference spatial edge image, the ordering of the sequence corresponding to the order of the mapped coordinates along the contour. The computer is configured to modify the depth estimates associated with the edges in the sequence, based on a sequence filtering function. The computer is configured to use the depth estimates associated with the edges in the sequence and the mapped coordinates associated with the edges in the sequence to create a three-dimensional representation of a surface of the object.

In some embodiments, the sequence filtering function eliminates sequences having fewer depth estimates than a threshold.

In some embodiments, the sequence filtering function applies a smoothing function to the depth estimates in the sequence.

In some embodiments, the sequence filtering function limits the smoothing function to depth estimates that are within a threshold of the result of the smoothing function.

In some embodiments, estimating the depth associated with selected edges in the epipolar plane edge images is done as a function of the slope of the line of best fit passing through those edges.

In some embodiments, estimating the depth associated with selected edges in the epipolar plane edge images is done using the depth to the point in space that minimizes a function of the distances from the rays passing through those edges and their corresponding spatial image centers of projection.

In some embodiments, selecting the reference image is done by selecting the middle of the redundant set of images.

In some embodiments, the imaging module includes linear arrays of cameras configured together. Each edge of the configuration shares cameras of its linear array with the adjacent edges of the configuration. The spatial image from a camera shared by two linear arrays may be used as the reference spatial image. The edges in the reference spatial image are used to determine a correspondence between the two three-dimensional representations of the surface of the object determined using the spatial images from each linear array. In some embodiments, the configuration is a triangle. In some embodiments, the configuration is a rectangle. In some embodiments, multiple polygons are used to tile the surface of a sphere.

In some embodiments, the multiple cameras are synchronized in such a way that pixels in the same position of the spatial images of the cameras are captured at the same time.

In some embodiments, the images from a configuration are used to synthesize an image presenting the view from a virtual camera that does not actually exist.

In some embodiments, the images from a configuration are used to synthesize an image presenting the view from two virtual cameras that do not actually exist, the positions of the two cameras chosen to create a stereo three-dimensional image.

In some embodiments, a polygonal array of cameras around the edge of a display device used for teleconferencing are used to synthesize an image presenting a participant in the teleconference from a view aligned with the gaze of the participant.

In some embodiments, the images from a configuration are used to synthesize images presenting the view from a moving camera that does not actually exist, the position of the moving camera aligned with the position of the eye of a viewer, the presentation providing the illusion of depth through motion stereo.

In some embodiments, the imaging module includes a linear array of cameras that is positioned along a cylinder with the cameras directed outward from the center of the cylinder. Multiple linear arrays are positioned along the surface of the cylinder and are overlapping to cover the entire view area around the cylinder. In some embodiments, the images from a configuration are used to synthesize three-dimensional stereo images of the scene around the cameras. In some embodiments, the images from a configuration are used to synthesize a mosaic panoramic image from the spatial images from the cameras. In some embodiments, the images from a configuration are used to synthesize images of the scene around the cameras for use with a virtual reality display. In some embodiments, images from a configuration are used to synthesize images of the scene around the cameras with view positions and orientations determined after the recording of the spatial images.

At least one aspect of the present disclosure is directed to a method of creating a three-dimensional representation of an object. The method includes a computer creating, based on a known geometry of a set of image sources and a set of spatial images from the sources, a set of transformed spatial images. The method includes a computer creating, based on the set of transformed spatial images, a set of second derivative epipolar plane images. The method includes a computer selecting a reference spatial image from the set of spatial images. The method includes a computer mapping a set of selected edges in the second derivative epipolar plane images to edges in the reference spatial image. The method includes a computer selecting a sequence of the selected edges that map to a contour in the reference spatial image, ordered by the contour. The method includes a computer computing filtered depth estimates associated with the edges in the sequence. The method includes a computer creating a three-dimensional representation of an object, based on the depth estimates, the contour, the mapping, and the set of spatial images.

At least one aspect of the present disclosure is directed to a method for determining a three-dimensional representation of a surface of an object. The method includes a computer capturing a redundant set of spatial images using a set of cameras, each spatial image including a representation of a subset of the object. The method includes a computer using known camera geometry to determine an epipolar line in each spatial image that lies in the same epipolar plane containing a feature on the object. The method includes a computer applying spatial collineation transformations, based on the known camera geometry, to the redundant set of spatial images to create a set of transformed spatial images. The method includes a computer applying a second derivative filter to the set of transformed spatial images to create a set of second derivative spatial images. The method includes a computer constructing second derivative epipolar plane images using the values in the set of second derivative images along the epipolar lines in each spatial image as values along parallel lines in the second derivative epipolar plane images. The method includes a computer calculating interpolated zero crossings in the second derivative epipolar plane images to form epipolar plane edge images. The method includes a computer selecting edges in the epipolar plane edge images that represent a single image feature in the redundant set of spatial images. The method includes a computer computing depth estimates associated with the selected edges in the epipolar plane edge images. The method includes a computer selecting a reference second derivative spatial image. The method includes a computer calculating interpolated zero crossings in the reference second derivative spatial image to form a reference spatial edge image. The method includes a computer mapping the selected edges in the epipolar plane edge images to edges in the reference spatial edge image. The method includes a computer identifying contours in the reference spatial edge image. The method includes a computer collecting a sequence of the selected edges in the epipolar plane edge images that map to the same contour in the reference spatial edge image, the ordering of the sequence corresponding to the order of the mapped coordinates along the contour. The method includes a computer modifying the depth estimates associated with the edges in the sequence, based on a sequence filtering function. The method includes a computer using the depth estimates associated with the edges in the sequence and the mapped coordinates associated with the edges in the sequence to create a three-dimensional representation of a surface of the object.

At least one aspect of the present disclosure is directed to a non-transitory computer readable medium storing instructions that, when executed by one or more processors, facilitate creating a three-dimensional representation of an object. The instructions include instructions to create, based on a known geometry of a set of image sources and a set of spatial images from the sources, a set of transformed spatial images. The instructions include instructions to create, based on the set of transformed spatial images, a set of second derivative epipolar plane images. The instructions include instructions to select a reference spatial image from the set of spatial images. The instructions include instructions to map a set of selected edges in the second derivative epipolar plane images to edges in the reference spatial image. The instructions include instructions to select a sequence of the selected edges that map to a contour in the reference spatial image, ordered by the contour. The instructions include instructions to compute filtered depth estimates associated with the edges in the sequence. The instructions include instructions to create a three-dimensional representation of an object, based on the depth estimates, the contour, the mapping, and the set of spatial images.

At least one aspect of the present disclosure is directed to a non-transitory computer readable medium storing instructions that, when executed by one or more processors, facilitate determining a three-dimensional representation of a surface of an object. The instructions include instructions to capture a redundant set of spatial images using a set of cameras, each spatial image including a representation of a subset of the object. The instructions include instructions to use known camera geometry to determine an epipolar line in each spatial image that lies in the same epipolar plane containing a feature on the object. The instructions include instructions to apply a spatial collineation transformation, based on the known camera geometry, to the redundant set of spatial images to create a set of transformed spatial images. The instructions include instructions to apply a second derivative filter to the set of transformed spatial images to create a set of second derivative spatial images. The instructions include instructions to construct second derivative epipolar plane images using the values in the set of second derivative images along the epipolar lines in each spatial image as values along parallel lines in the second derivative epipolar plane images. The instructions include instructions to calculate interpolated zero crossings in the second derivative epipolar plane images to form epipolar plane edge images. The instructions include instructions to select edges in the epipolar plane edge images that represent a single image feature in the redundant set of spatial images. The instructions include instructions to compute depth estimates associated with the selected edges in the epipolar plane edge images. The instructions include instructions to select a reference second derivative spatial image. The instructions include instructions to calculate interpolated zero crossings in the reference second derivative spatial image to form a reference spatial edge image. The instructions include instructions to map the selected edges in the epipolar plane edge images to edges in the reference spatial edge image. The instructions include instructions to identify contours in the reference spatial edge image. The instructions include instructions to collect a sequence of the selected edges in the epipolar plane edge images that map to the same contour in the reference spatial edge image, the ordering of the sequence corresponding to the order of the mapped coordinates along the contour. The instructions include instructions to modify the depth estimates associated with the edges in the sequence, based on a sequence filtering function. The instructions include instructions to use the depth estimates associated with the edges in the sequence and the mapped coordinates associated with the edges in the sequence to create a three-dimensional representation of a surface of the object.

Systems and methods of the present disclosure can facilitate determining a three-dimensional surface representation of an object. The system can include an imaging module, which can include a set of cameras arranged in a straight line. The system can include a calibration module, which can operate in conjunction with the imaging module to determine the camera geometry, such as position, orientation, focal length, lens distortion, pixel size, and so on. The system can include a computer, which can control the calibration module to determine the camera geometry, and which can control the imaging module to capture spatial images of a scene using the cameras. The system can include a memory, which is used by the computer to store information used to determine a three-dimensional surface representation of an object in the scene. The computer can use the camera geometry and the spatial images as inputs to an epipolar determination to produce epipolar lines for the spatial images in the memory. The computer can use the camera geometry, the spatial images, and the epipolar lines as inputs to a collineation transformation to produce transformed spatial images in the memory. The computer can use the transformed spatial images as input to a second derivative filter to produce second derivative spatial images in the memory. The computer can use the epipolar lines and the second derivative spatial images as inputs to an epipolar plane image construction to produce second derivative epipolar plane images in the memory. The computer can use the second derivative epipolar plane images as input to a zero-crossing determination to produce epipolar plane edge images in the memory. The computer can use the epipolar plane edge images as input to a feature selection to produce an edge selection in the memory. The computer can use the edge selection as input to a depth computation to produce depth estimates in the memory. The computer can use the second derivative spatial images as input to a zero-crossing determination to produce a reference spatial edge image, for a selected reference spatial image, in the memory. The computer can use the epipolar plane edge images as input to a mapping, along with the reference spatial edge image as input to a contour identification, to produce an edge sequence in the memory. The computer can use the depth estimates and the edge sequence as inputs to a sequence filtering function to produce modified depth estimates in the memory. The computer can use the transformed spatial images, the edge sequence, and the modified depth estimates as inputs to a three-dimensional mapping to produce a three-dimensional surface representation in the memory. The three-dimensional mapping can use the transformed spatial images as a source of color, illumination, texture, and so on for the three-dimensional surface representation.

Imaging in the round and on the sphere may become important in cinema and entertainment capture. The Oculus Rift and other virtual reality display devices may be used for display of captured live scenes, as opposed to computer-generated imagery. Easy access to encompassing, immersive 360-degree video may become an important commercial reality. These systems may also include binocularly stereoscopic displays, which can facilitate viewers in perceiving a world presented three-dimensionally, matching the space in which they live and work.

Some multi-camera designs for stereoscopic cylindrical or spherical imaging may employ radially directed imaging devices that share stereo information through significant overlap with their adjacent devices. This may require wide-angle lenses, correction of substantial distortion, high-pixel-count sensors (which may cost more and be more difficult to obtain in smaller form factors), and may require camera systems the size of a basketball or larger in order to accommodate human-like interoculars across adjacent imaging viewpoints. This large size may interfere with easy deployment and utilization in embedded systems.

Systems and methods of the present disclosure describe a configuration in which the cameras/lenses viewing an area may not be adjacent and may be structured to minimize distortion, reduce resolution compromise, minimize the physical size of the capture device, and facilitate the use of simplified, cheaper, and more effective processing techniques.

A desired use of the data captured from this imaging system may be for display in a virtual or augmented reality system or in related applications. Another desired use may be for 3D ranging based on determining correspondences in the images. Some existing systems can use correspondences in two images by searching for features that match well in the two images. Binocular stereo ranging using this image matching through search can be problematic, erroneous, and computationally expensive. Correspondence-based binocular stereopsis has not as yet been demonstrated with adequate success for reliable commercial use. An approach to correspondence-based ranging uses Epipolar Plane Image (EPI) Analysis. EPI analysis is a technique that exploits the redundancy and constraints of multiple simultaneous image acquisitions and provides simple, reliable, and precise passive ranging where determining the correspondence does not require search.

Systems and methods of the present disclosure can acquire depth information with uniform resolution over a 360-degree in-the-surround capture space. Embodiments provide search-free estimation of 360-degree scene 3D geometry by using of linear-array imaging of EPI analysis. Embodiments provide multiple smooth and continuous panoramic representations of the surrounding scene using mosaicking methods that are less subject to blur and double imaging in their composition. Embodiments also provide more perspectives for viewpoint selection, viewpoint interpolation, and choice of baselines (which is termed "interoculars") for desired depth-perspective effects. These embodiments facilitate applications such as cinema, where viewpoints are desired from positions where no camera can be located (requiring balancing focal length and baseline to synthesize the appropriate stereoscopic images), and surveillance, where increased baselines (interocular distance for the observer) provide enhanced depth awareness. Embodiments also allow arbitrary and varying camera baselines, which increase accuracy and precision without requiring a large physical assembly.

The use of linear-array multi-view capture may facilitate search-free estimation of the 360-degree 3D geometry of a scene, which may facilitate using the imagery of the surrounding space for viewing experiences, and may also facilitate representing objects in the surrounding space in computer model form for 3D display, interaction, and control tasks.

Embodiments of the present disclosure capture images of the surrounding environment in multiscopic stereo, and do so with the redundancy of multiple perspectives, which facilitate increased quality, reliability, and utility. These embodiments provide an integrated solution for the 360-degree capture and modeling of complex natural scenes. In one embodiment, the system delivers imagery appropriate for binocular stereoscopic viewing on head-mounted displays or for free-viewpoint automultiscopic presentation. This embodiment facilitates gaming or related advanced-cinema applications where consumers are relatively stationary, and also facilitates applications where moving subjects are free to navigate within some space in correspondence with an originally observed scene. These applications facilitate the viewer in having an immersive experience, and receiving visual data compatible with what might be observed at the physical site at the time of capture, including variations arising from large and small head movements.

In one embodiment, the acquisition of 3D and multi-perspective geometry facilitates 3D computer graphic rendering in the form of computer generated imagery (CGI), which is used to generate viewpoints away from the path of the camera, and facilitates generating these viewpoints with reduced errors, which in turn reduces disruption to the immersive experience.

Turning to the drawings, FIG. 1A is an illustrative block diagram of an embodiment of a system for determining a three-dimensional representation of a surface of an object from a redundant set of images. Information 102 about the geometry of image sources, along with spatial images 101 from the image sources, is used to create a set of transformed spatial images 103. The transformed spatial images 103 are used to create a set of second derivative epipolar plane images 104. A reference spatial image 105 is chosen, and a map 106 is created that maps edges in the epipolar plane images 104 to the reference spatial image 105. The reference spatial image 105 is used to create a contour 107, and the contour 107 is used to select and order mapped edges 106 into a sequence 108 of edges. The edges in the sequence 108 are used to calculate depth estimates 109, which are filtered. The spatial images 101, the contour 107, the mapping 106, and the filtered depth estimates 109 are used to create a three-dimensional representation of an object in the original scene.

Figure 1B:
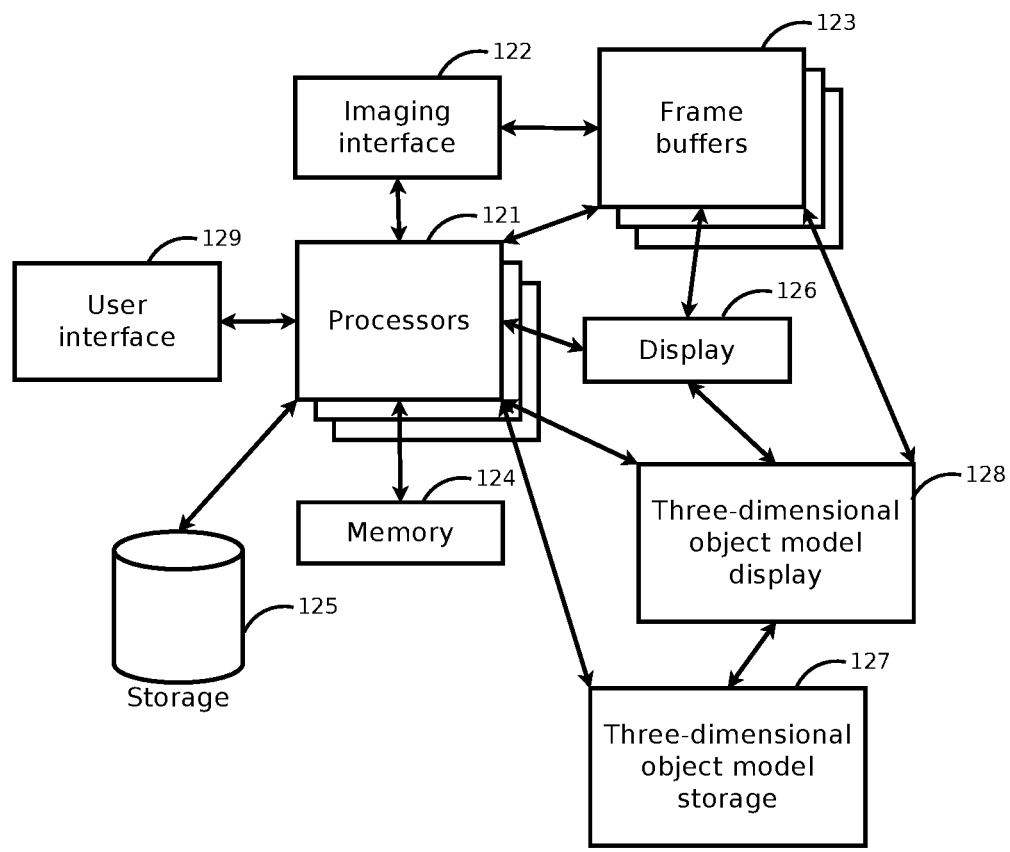
FIG. 1B is an illustrative block diagram of an embodiment of a system for determining a three-dimensional representation of a surface of an object from a set of images.

FIG. 1B is an illustrative block diagram of an embodiment of a system for determining a three-dimensional representation of a surface of an object from a redundant set of images. A set of one or more processors 121 receives image information from an imaging interface 122. The processors 121 store the image information in one or more of a set of frame buffers 123, a memory 124, and a storage unit 125. The processors also access a user interface 129 and a display 126 to process the image information. The processors 121 store a three-dimensional object model in a three-dimensional object model storage 127 and display the three-dimensional object model with a three-dimensional object model display 128. The display 126 is connected to the frame buffers 123. The three-dimensional object model display 128 is connected to the display 126 and the frame buffers 123. The three-dimensional object model storage 127 is connected to the three-dimensional object model display 128.

Figure 2:
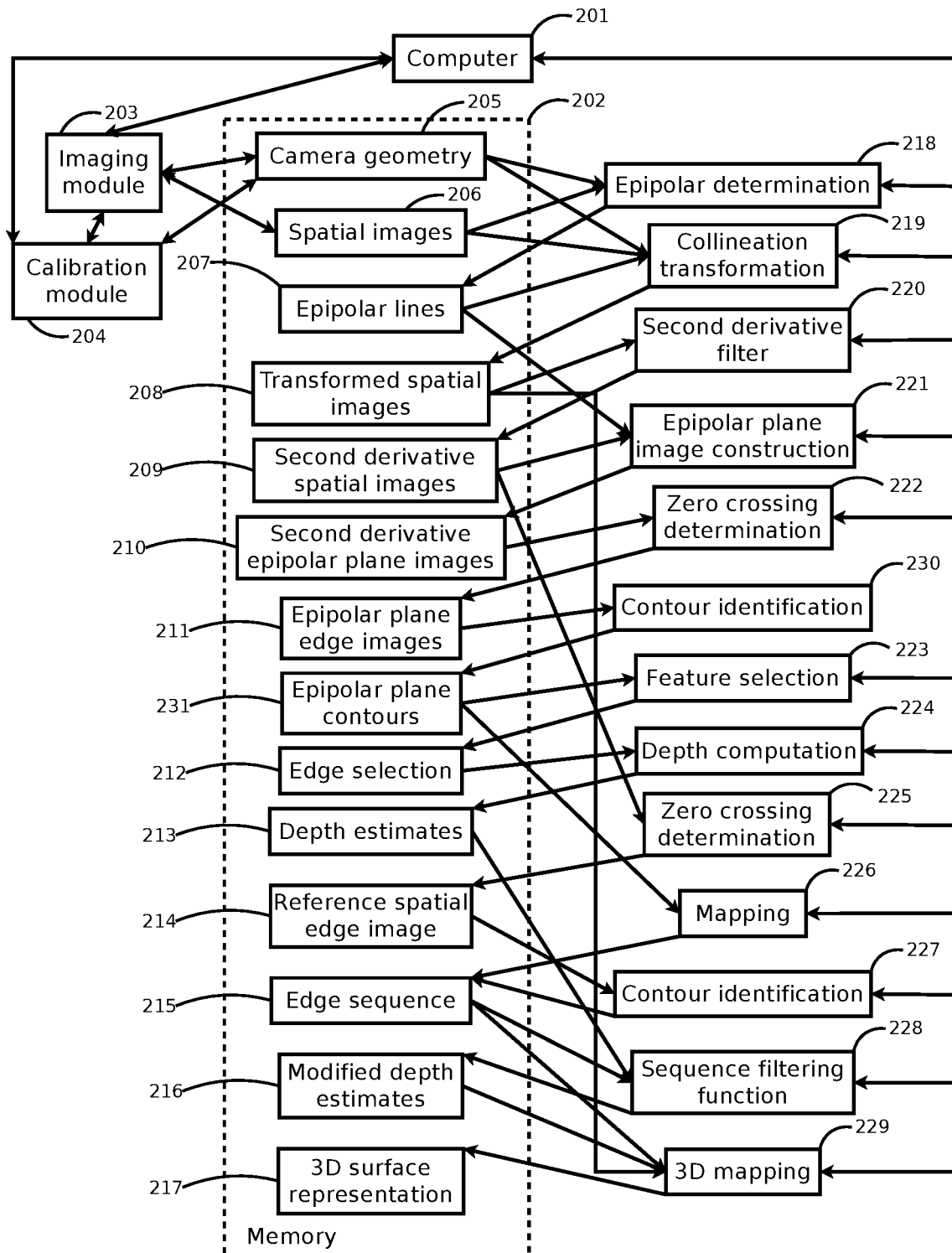
FIG. 2 is an illustrative block diagram of an embodiment of a system for determining a three-dimensional representation of a surface of an object from a set of images.

FIG. 2 is an illustrative block diagram of an embodiment of a system for determining a three-dimensional representation of a surface of an object from a redundant set of images. A computer 201 accesses an imaging module 203 to store camera geometry 205 and spatial images 206 in a memory 202. The cameras acquire information about a scene and the memory acts as storage for these data while they are being operated upon. The computer 201 also accesses a calibration module 204 which is used in conjunction with the imaging module 203 to store the camera geometry 205 in the memory. Camera geometry information is needed for structuring the acquired data for the specialized range processing that will follow. The computer 201 uses the camera geometry 205 and the spatial images 206 as inputs to an epipolar determination 218 to produce epipolar lines 207 for the spatial images 206 in the memory 202. Epipolar lines are a construct that facilitate rapid, accurate, and precise computation of range information in a scene. The computer 201 uses the camera geometry 205, the spatial images 206, and the epipolar lines 207 as inputs to a rectifying transformation 219, which may be a collineation transformation, to produce transformed spatial images 208 in the memory 202. Rectifying transforms facilitate restructuring the images into a form optimized for ranging analysis and three-dimensional modeling. The computer 201 uses the transformed spatial images 208 as input to a second derivative filter 220 to produce second derivative spatial images 209 in the memory 202. Second derivative operators highlight an image's most discriminative element—its contrast edges—which will bring less dense but more reliable and precise results. The computer 201 uses the epipolar lines 207 and the second derivative spatial images 209 as inputs to an epipolar plane image construction 221 to produce second derivative epipolar plane images 210 in the memory 202. Reorganizing the imagery into epipolar plane images facilitates localizing information for range estimation. The computer 201 uses the second derivative epipolar plane images 210 as input to a zero-crossing determination 222 to produce one or more epipolar plane edge images 211 in the memory 202. Epipolar plane edge images fully contain the information required for estimating the 3D location of observed contrast edges in the scene. The computer 201 uses the one or more epipolar plane edge images 211 as input to a contour identification 230 to produce one or more epipolar plane contours 231 in the memory 202. The contour representation groups together observations of contrast edges that are related across different cameras, facilitating their subsequent use in estimating 3D position. The computer 201 uses the one or more epipolar plane contours 231 as input to a feature selection 223 to produce an edge selection 212 in the memory 202. The grouped observations must lie in lines, and this selection process facilitates determining the parameters of these lines. The computer 201 uses the edge selection 212 and calibration information (not arrowed) as input to a depth computation 224 to produce depth estimates 213 in the memory 202. The linear relationship of feature observations across cameras means that depths are easily computed from the determined lines and the geometric relationships between the cameras as identified by the calibration process. The computer 201 uses the second derivative spatial images 209 as input to a zero-crossing determination 225 to produce a reference spatial edge image 214, for a selected reference spatial image, in the memory 202. The reference spatial image defines the perspective for the data processing to follow, and grouping its contrast edges into structured contours means the processing can focus on the scene's most discriminative elements—its edges—bringing greater accuracy, precision, and reliability. The computer 201 uses the one or more epipolar plane contours 231 as input to a mapping 226, along with the reference spatial edge image 214 as input to a contour identification 227, to produce an edge sequence 215 in the memory 202. The edge sequence places range estimates all along these scene contrast edges, providing not just scene 3D point estimates but higher order scene content descriptors, such as 3D textures, 3D details, and 3D occluding contours. The computer 201 uses the depth estimates 213 and the edge sequence 215 as inputs to a sequence filtering function 228 to produce modified depth estimates 216 in the memory 202. Noise and error are inevitable, and the filtering facilitated by the contour sequences means semantically related scene elements are operated upon together in minimizing the influence of outliers and mistakes. The computer 201 uses the transformed spatial images 208, the edge sequence 215, and the modified depth estimates 216 as inputs to a three-dimensional analysis 229 to produce a three-dimensional surface representation 217 in the memory 202. The result is not a set of measures on map coordinates but a three-dimensional representation of the contrast edges of the scene, each localized to the precision attainable through its observed edge features. Since feature size may be selected by the size of second derivative operator chosen, and multiple scales of analysis may be selected and integrated through successive operation of the methods disclosed here, a range of scales and resolutions may be brought together for a high quality resulting three-dimensional representation. The three-dimensional mapping 229 uses the transformed spatial images 208 as a source of color, illumination, texture, and so on for the three-dimensional surface representation 217. 3D shape is only part of what is needed in describing a scene, with chrominance and other characteristics being needed for many applications, and the originating imagery may provide this information.

The one or more computers 201 associated with the system for determining a three-dimensional representation of a surface of an object do not need to be physically proximate to each other or in the same machine farm. Thus, the computers logically grouped as a machine farm may be interconnected using a local-area network (LAN) connection or a wide-area network (WAN) connection (e.g., such as the Internet or a metropolitan-area network (MAN) connection). For example, a machine farm may include computers physically located in different continents or different regions of a continent, country, state, city, campus, or room. Data transmission speeds between computers in the machine farm can be increased if the computers are connected using a LAN connection or some form of direct connection.

Management of the computers may be de-centralized. For example, one or more computers may comprise components, subsystems and circuits to support one or more management services. In one of these embodiments, one or more computers provide functionality for management of dynamic data, including techniques for handling failover, data replication, and increasing robustness. Each computer may communicate with a persistent store and, in some embodiments, with a dynamic store.

A computer may include a file server, application server, web server, proxy server, appliance, network appliance, gateway, gateway, gateway server, virtualization server, deployment server, secure sockets layer virtual private network ("SSL VPN") server, or firewall. In one embodiment, the computer may be referred to as a remote machine or a node. In one embodiment, the computer may be referred to as a cloud.

The system and its components, such as a computer 201, memory 202, imaging module 203, and calibration module 204, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a computer 201, memory 202, imaging module 203, and calibration module 204, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 3:
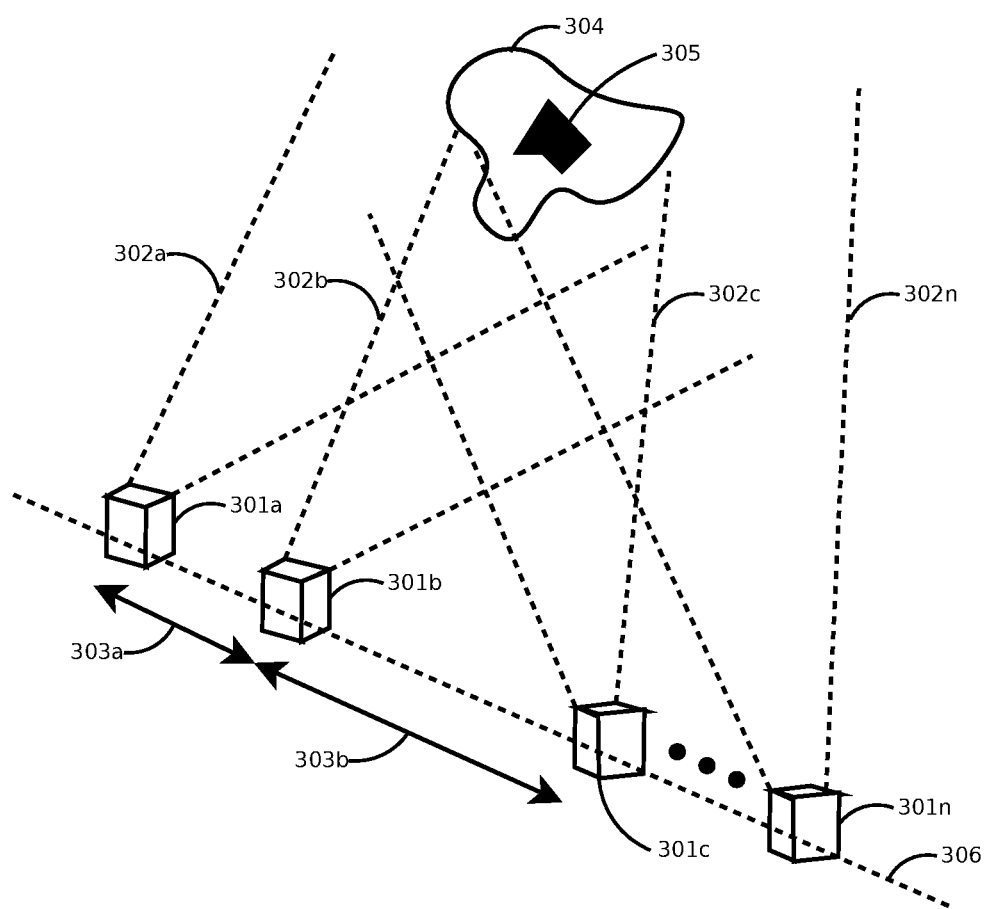
FIG. 3 is an illustrative block diagram of an embodiment of capturing a set of images of an object, using a set of cameras with known geometries.

FIG. 3 is an illustrative block diagram of an embodiment of capturing a redundant set of images of an object, using a set of cameras with known geometries. A set of cameras 301a-301n are arranged along a straight line 306. There may be some deviation from the straight line 306 in the positioning of some or all of the cameras 301a-301n. The cameras 301a-301n do not need to be oriented in the same direction, so in the example embodiment of FIG. 3, the view angle 302b of camera 301b does not point in the same direction as the view angle 302c of camera 301c. The cameras 301a-301n do not need to be equally spaced along the line 306, so in the example embodiment of FIG. 3, the distance 303a between camera 301a and camera 301b is not the same as the distance 303b between camera 301b and camera 301c. The view angles 302a-302n of cameras 301a-301n at least partially overlap, so in the example embodiment of FIG. 3, some or all of the view angles 302a-302n includes at least part of the object 304, and in particular, some or all of the view angles 302a-302n includes the feature 305 on the object 304. The geometry of the cameras 301a-302n is known, so their position and orientation along the line 306 is known. The fine details of the positions and orientations of the cameras 301a-302n are determined by a calibration module as previously described with respect to FIG. 2. The calibration module facilitates accommodating some or all of the errors that arise from deviation of the positioning of the cameras 301a-301n from the straight line 306.

The cameras 301a-301n may be connected by a computer network. The network once again can include a LAN or WAN. In some embodiments, there are multiple networks between the devices and the computers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

Figure 4A:
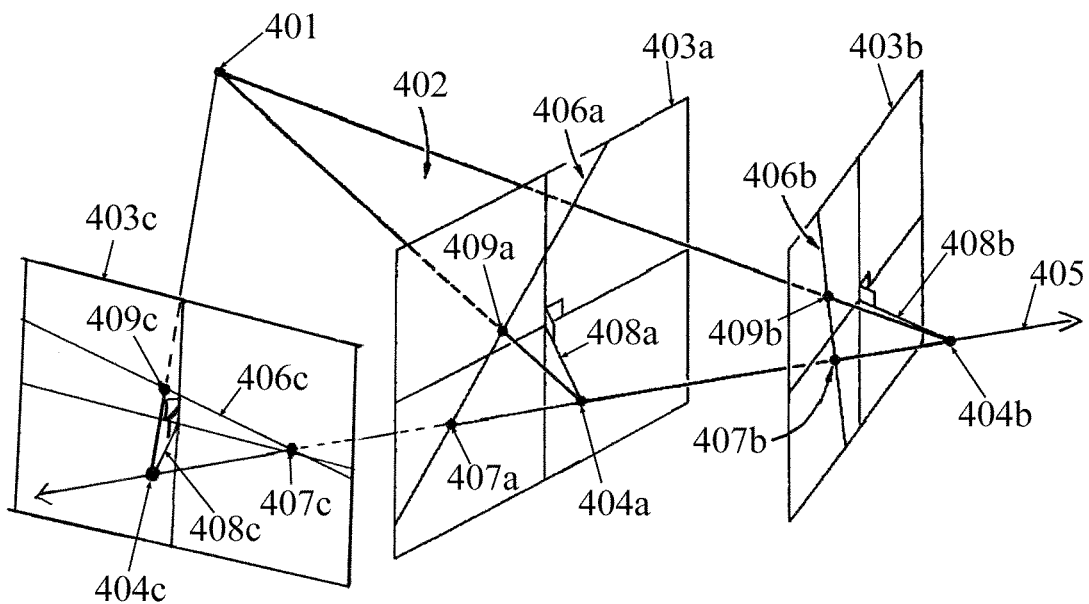
FIG. 4A is an illustrative block diagram of an embodiment of epipolar lines for images from a set of cameras.

FIG. 4A is an illustrative block diagram of an embodiment of epipolar lines for images from a set of cameras. A first camera with an image center of projection 404a is oriented to point along line 408a and has an image plane 403a. Similarly, a second camera with an image center of projection 404b is oriented to point along line 408b and has an image plane 403b. A point 401 is visible to both cameras, and the three points 401, 404a, and 404b form an epipolar plane 402. The intersection of the epipolar plane 402 with the image plane 403a forms an epipolar line 406a for the first camera. Similarly, the intersection of the epipolar plane 402 with the image plane 403b forms an epipolar line 406b for the second camera. The epipolar line 406a of the first camera contains the intersection 407a of the image plane 403a of the first camera with the line 405 between the center of projection 404a of the first camera and center of projection 404b of the second camera. Similarly, the epipolar line 406b of the second camera contains the intersection 407b of the image plane 403b of the second camera with the line 405 between the center of projection 404b of the second camera and the center of projection 404a of the first camera. The line 405 may be called the epipolar axis. Points 407a and 407b may be called images of the epipolar axis, or epipoles. The epipolar line 406a of the first camera contains the intersection 409a of the image plane 403a of the first camera with the line between point 401 and the center of projection 404a of the first camera. Similarly, the epipolar line 406b of the second camera contains the intersection 409b of the image plane 403b of the second camera with the line between point 401 and the center of projection 404b of the second camera.

The same construction can be generalized for multiple cameras with centers of projection on the same straight line. In the embodiment illustrated in FIG. 4A, a third camera has a center of projection 404c on the line 405 with an orientation along line 408c and an image plane 403c. The epipolar line 406c for the third camera is computed in the same way, as the intersection between the image plane 403c of the camera and the epipolar plane 402. The epipolar line 406c contains the intersection 407c of line 405 with the image plane 403c, and also contains the intersection 409c of the image plane 403c with the line between point 401 and the center of projection 404c of the camera. There may be some deviation of the centers of projection 404A, 404B, and 404C from the straight line due to mechanical construction issues.

It should be noted that additional cameras with centers of projection that lie along the line 405 passing through 404a and 404b (the epipolar axis) define additional epipoles similar to points 407a and 407b and define additional epipolar lines similar to lines 406a and 406b, which lie in the epipolar plane 402. This family of epipolar lines lying in the epipolar plane 402 may be used to construct an epipolar plane image (EPI).

Figure 4B:
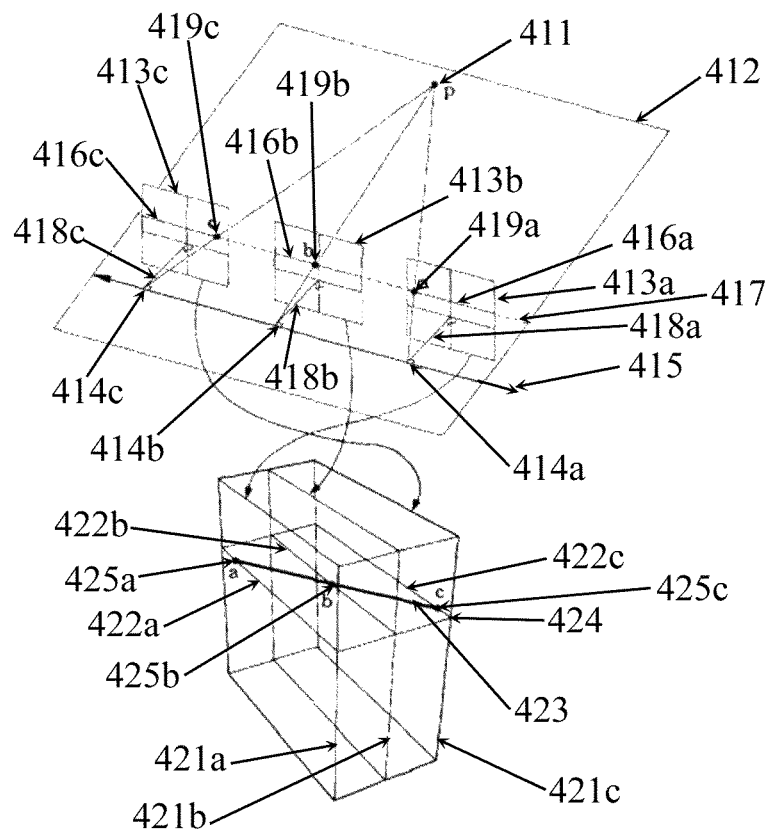
FIG. 4B is an illustrative block diagram of an embodiment of creating an epipolar plane image.

FIG. 4B is an illustrative block diagram of an embodiment of creating an epipolar plane image. Three cameras with image centers of projection 414a-414c are oriented to point along lines 418a-418c and have image planes 413a-413c. A point 411 is visible to all three cameras, and the four points 411 and 414a-414c form an epipolar plane 412. The intersection of the epipolar plane 412 with the image planes 413a-413c forms epipolar lines 416a-416c for the three cameras. The line 415 between the centers of projection 414a-414c of the cameras is called the epipolar axis. The epipolar lines 416a-416c contain the intersections 419a-419c of the image planes 413a-413c with the lines between point 411 and the centers of projection 414a-414c of the three cameras. Conceptually, the images 413a-413c are then stacked up 421a-421c, and then a slice 424 through the stack gives an epipolar plane image. The epipolar plane image 424 contains the epipolar lines 416a-416c of the images as scanlines 422a-422c. For cameras with equally spaced centers of projection 414a-414c, the projections 419a-419c of a single point 411 map to points 425a-425c in the epipolar plane image that lie along a straight line 423.

It should be noted that an advantage of this structuring is that anything in the scene of FIG. 4B that lies in the plane 412 and is viewed from a position along line 415 will appear in an image plane such as 413a-413c along a single line such as 417. A family of epipolar planes such as 412 may be defined by a family of points such as 411, off the plane 412, which form a family of lines as 417, covering the images 413a-413c. Each such line contains all the observations of the point as viewed from its different observing camera positions such as 414a-414c. Keeping the images 413a-413c and others separate, their epipolar lines 416a-416c and so on may be composed into single epipolar plane images (EPIs) such as 424. All estimates are based on observations confined to the epipolar plane in which they are observed, and there are no relevant observations outside of that plane. Because of this the EPI images may be processed independently and in parallel.

Figure 5:
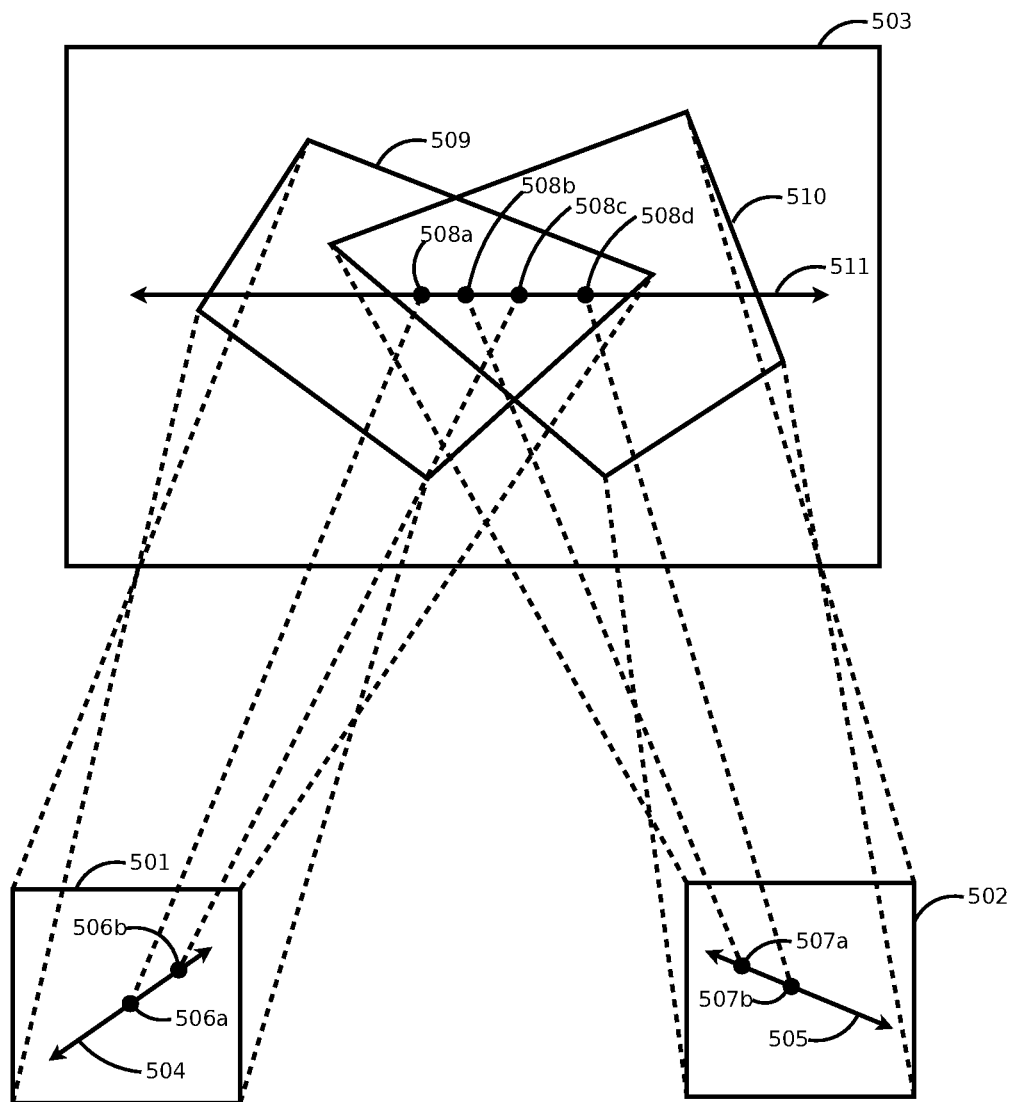
FIG. 5 is an illustrative block diagram of an embodiment of an epipolar rectifying collineation transformation of two images.

FIG. 5 is an illustrative block diagram of an embodiment of an epipolar rectifying collineation transformation of two images. An image 501 from a first camera has an epipolar line 504 with two points 506a and 506b on the epipolar line 504. Similarly, an image 502 from a second camera has an epipolar line 505 with two points 507a and 507b on the epipolar line 505. A collineation transformation transforms image 501 to section 509 of image 503 in such a way that epipolar line 504 in image 501 maps into epipolar line 511 in image 503, and points 506a and 506b in image 501 map into points 508a and 508c respectively in image 503, where points 508a and 508c lie on epipolar line 511 in image 503. Similarly, the collineation transformation transforms image 502 to section 510 of image 503 in such a way that epipolar line 505 in image 502 maps into the same epipolar line 511 in image 503, and points 507a and 507b in image 502 map into points 508b and 508d respectively in image 503, where points 508b and 508d lie on epipolar line 511 in image 503. The collineation transform 219 is required for general epipolar rectification, although simpler camera geometries such as that of the Lytro and related microlens cameras may be served by affine transforms or simple recentering displacements.

The process of determining position, orientation, and related parameters of the cameras that leads to the reprojections of FIG. 5 is called calibration. This calibration may be achieved through observation and analysis of images of a "calibration target" containing known features at known positions and, in some embodiments, containing known colors. The calibration estimates image acquisition parameters such as the size of the pixels on the sensors, the focal length of the lenses, the scene imaging distortion introduced by those lenses, the displacements and relative orientations of the sensors with respect to each other, the behavior of the sensor's color measurements with respect to known color signals in the scene, and so on. Estimation of these parameters may either be a linear process or a combination of linear and non-linear processes aimed at modeling the image acquisition process at each camera to estimate a set of parameters for the imaging elements using the image data with respect to known scene information. In the example embodiment of the image acquisition described with respect to FIG. 4A and the image transformation described with respect to FIG. 5, the set of parameter estimations is one that maps the images 501, 502, and so on to image plane 503 by their estimated orientations minimizing the deviation of points such as 401 observed as features such as 506a-506b, 507a-507b, and so on, from their projection to epipolar lines 511, and correcting lens distortions.

Figure 6:
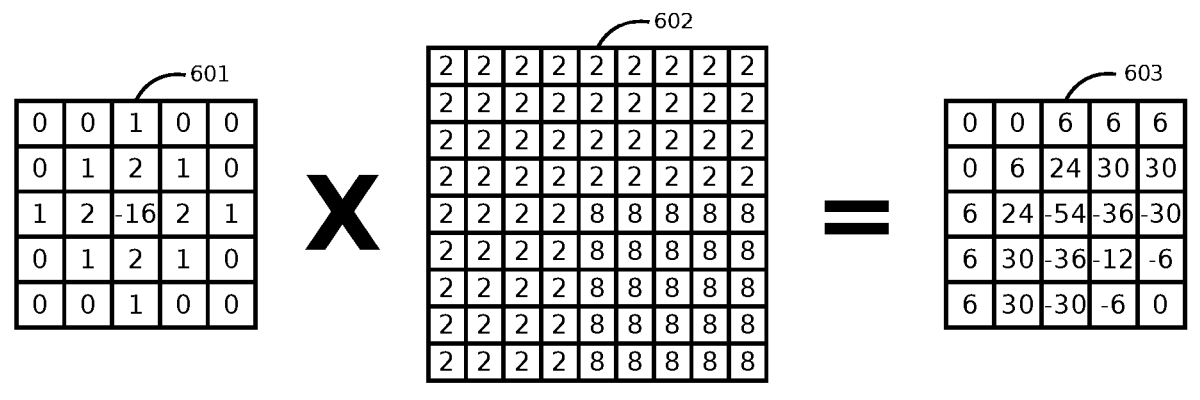

FIG. 6 is an illustrative block diagram of an embodiment of a two-dimensional second derivative filter. The input image 602 is shown as an array of pixel values. The second derivative is computed by convolving the input image 602 with a filter mask 601. In the example embodiment of FIG. 6, the filter mask 601 is a simple two-dimensional Laplacian of a Gaussian operator. The output 603 is the convolution of the filter mask 601 with the input image 602. In the example embodiment of FIG. 6, the input image 602 is a step function in two dimensions, and the output 603 of the second derivative filter has positive values at the left and top edge of the step and negative values at the right lower corner edge of the step.

It should be noted that although FIG. 6 illustrates a two-dimensional second derivative filter, a three-dimensional second derivative volumetric filter may be used for this computation. An advantage in using the two-dimensional filter is that, while providing an adequate approximation for the zero-crossing determination, the two-dimensional filter permits zero-crossing definition over all acquired spatial images, including those within the half-width of the filter. This restricts those areas without second derivative measurements to the half-filter-width rows and columns of the spatial image boundaries, rather than extending as well to the beginning and ending half-filter-width areas at the EPI image camera-dimension boundaries. This facilitates including contributions from all cameras in constructing epipolar plane edge images.

Figure 7:
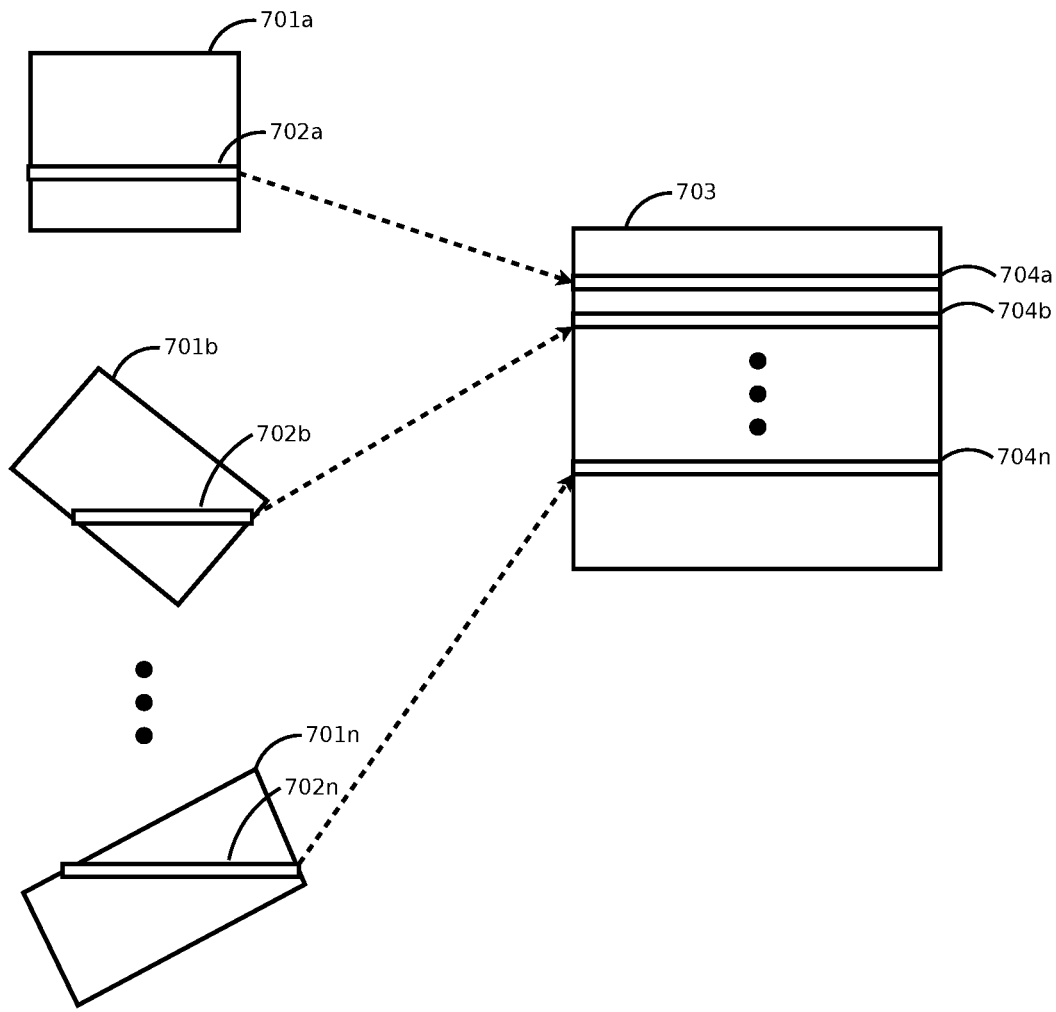
FIG. 7 is an illustrative block diagram of an embodiment of constructing a second derivative epipolar plane image.

FIG. 7 is an illustrative block diagram of an embodiment of constructing a second derivative epipolar plane image. The images 701a-701n are the result of applying a collineation transformation as described with respect to FIG. 5, and then applying a second derivative filter as described with respect to FIG. 6. An epipolar line 702a in image 701a is determined as described with respect to FIG. 5, and the values along the epipolar line 702a are used to make a line 704a in the resulting second derivative epipolar plane image 703. In a similar way, the epipolar lines 702b-702n in images 701b-701n are determined as described with respect to FIG. 5, and the values along the epipolar lines 702b-702n are used to make lines 704b-704n in the resulting second derivative epipolar plane image 703. In this way, the second derivative epipolar plane image 703 is constructed.

It should be noted that in another embodiment, the second derivative epipolar plane image can be constructed by applying the second derivative computation to the spatial image, applying the collineation transform to the result of the second derivative computation, and resampling the result of the collineation transform to form the second derivative epipolar plane image.

Figure 8A:
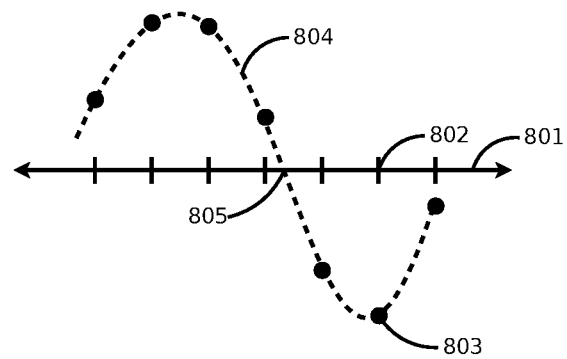
FIG. 8A is an illustrative block diagram of an embodiment of an interpolated zero crossing.

FIG. 8A is an illustrative block diagram of an embodiment of an interpolated zero crossing. The positions along an axis 801 in an image have discrete values for the pixels. In the example embodiment of FIG. 8A, position 802 is shown with a pixel value of 803. The pixel values have a continuous curve 804 fit to the discrete values, and the zero crossing 805 of the continuous curve is computed as an interpolated zero, whose position may be represented as a floating point number.

Figure 8B:
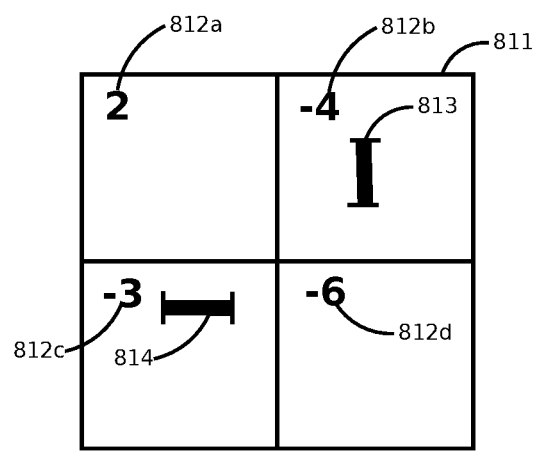
FIG. 8B is an illustrative block diagram of an embodiment of determining edges in two directions using interpolated zero crossings.

FIG. 8B is an illustrative block diagram of an embodiment of determining edges in two directions using interpolated zero crossings. A subset 811 of four pixels of an image is shown. The pixel values 812a-812d are shown for the pixels. The position of an interpolated zero crossing 813 is computed in the horizontal direction using the method described with respect to FIG. 8A, and the position of an interpolated zero crossing 814 is computed in the vertical direction using the method described with respect to FIG. 8A. In this way, interpolated zero crossings are used to determine edges in both horizontal and vertical directions.

Figure 9A:
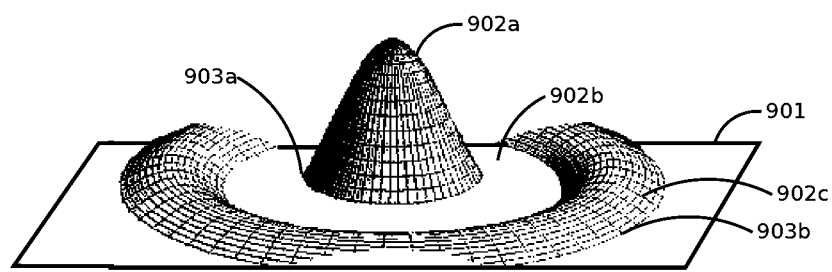
FIG. 9A is an illustrative block diagram of an embodiment of an interpolated zero crossing of a two-dimensional function.

FIG. 9A is an illustrative block diagram of an embodiment of an interpolated zero crossing of a two-dimensional function. The pixel values in an image 901 represent a two-dimensional function where a pixel value represents the height of the function above the plane. In areas where the pixel values are positive, such as 902a and 902c, the function is above the plane. In areas where the pixel values are negative, such as 902b, the function is below the plane, and is not visible in the example embodiment shown in FIG. 9A. Where the function intersects the plane, such as at 903a and 903b, the function represents a zero crossing. Since an image with pixels represents discrete values of the continuous function shown by 902a and 902c, the continuous function may be represented by an interpolation of the discrete values, so the zero crossings such as 903a and 903b are then interpolated zero crossings of the two-dimensional function. It should be noted that the example embodiment depicted in FIG. 9A is the two-dimensional analog of the one-dimensional example embodiment depicted in FIG. 8A.

Figure 9B:
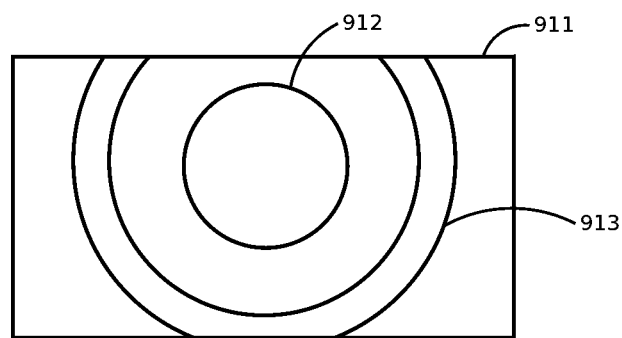
FIG. 9B is an illustrative block diagram of an embodiment of contours of a two-dimensional function.

FIG. 9B is an illustrative block diagram of an embodiment of contours of a two-dimensional function. As described in FIG. 9A, the zero crossings of a two-dimensional image 911 are computed as a continuous interpolation. These zero crossings then form continuous contours in the image 911. The contours may be closed as depicted for contour 912, or they may be open but intersect the edge of the image as depicted for contour 913. The contours depicted in the example embodiment of FIG. 9B are the contours associated with the zero crossings depicted in the example embodiment of FIG. 9A.

The zero-crossing edges are joined explicitly into a contour data representation using a technique such as a linked list or an adjacency vector. This representation may be either closed or open, as depicted in FIG. 9B. Using this contour representation makes explicit the continuity of the spatial relationship between adjacent elements in the image. This is because the contour is based on the topology of the local object luminance function, which may be tied to the scene structure in the real world, rather than being based on proximity in a spatial image, which may have little or no relationship to proximity in the real world.

Figure 9C:
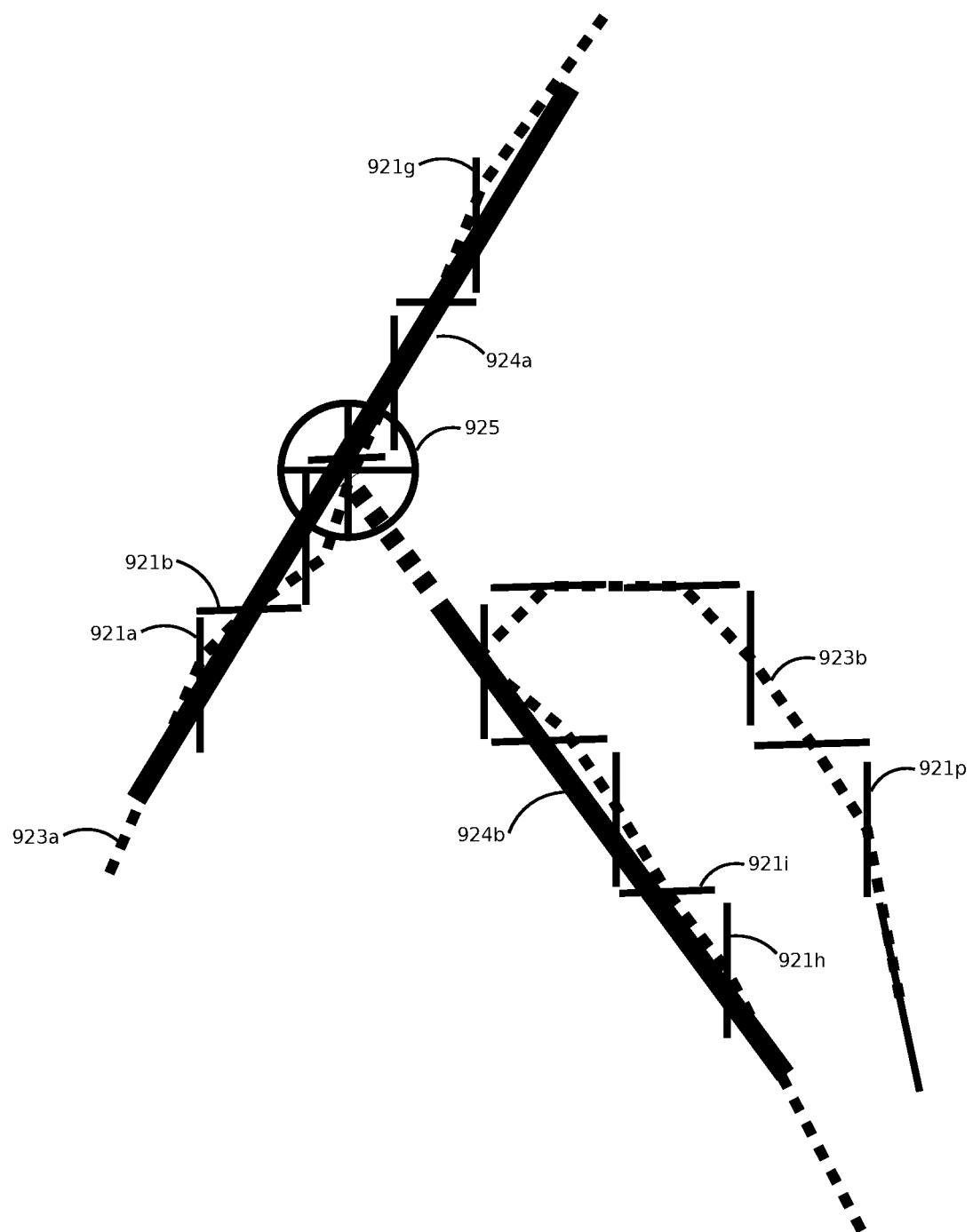
FIG. 9C is an illustrative block diagram of an embodiment of two contours of a two-dimensional function.

FIG. 9C is an illustrative block diagram of an embodiment of two contours of a two-dimensional function. Edges 921a-921g are grouped as linear fit 924a, and edges 921h-921p are grouped as linear fit 924b. As described with respect to FIG. 9B, edges may be selected to construct contours. In the embodiment depicted in FIG. 9C, edges 921a-921g are selected to construct contour 923a, and edges 921h-921p are selected to construct contour 923b. The feature selection 223 described with respect to FIG. 2 represents contour 923a as a line fit 924a determined from a subset of the contour edges 921a-921g. Similarly, the feature selection 223 described with respect to FIG. 2 represents contour 923b as a line fit 924b determined from a subset of the contour edges 921h-921p.

Extrapolation of a line fit such as 924b may intersect another line fit such as 924a. In an epipolar plane edge image, this intersection indicates that the scene object feature to which 924b relates lies farther away and behind the scene object feature to which 924a relates. Detection of these intersections from the edge elements 921a-921p, the contours 923a-923b constructed from edge elements 921a-921p, and the line fits 924a-924b constructed from edge elements 921a-921p, leads to determining that the edge elements 921a-921g are occluding contours of an object in the scene. This determination of the occlusion relationship is a distinguishing feature of the EPI approach to range analysis and forming three-dimensional scene representations.

Figure 10A:
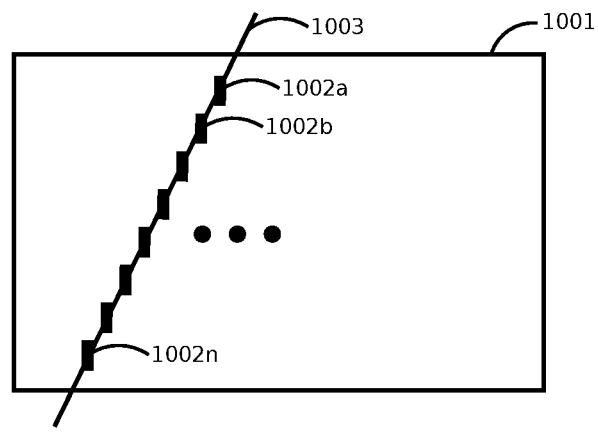
FIG. 10A is an illustrative block diagram of an embodiment of estimating the depth associated with selected edges using the slope of a line passing through those edges.

FIG. 10A is an illustrative block diagram of an embodiment of estimating the depth at the object feature associated with selected edges using the slope of a line passing through those edges. A set of edges 1002a-1002n is selected in an epipolar plane edge image 1001 that correspond to the same feature on an object. Edges 1002a-1002n are organized as a contour as identified by the contour identification 227 as described with respect to FIG. 2, using the method described with respect to FIG. 9C. For some camera geometries, it may be possible to fit a line 1003 to the edges 1002a-1002n in the epipolar plane edge image 1001, and the slope of the line 1003 can then be used to calculate the distance from the cameras to the feature on the object. In this way, an estimate of the depth of the edges is computed. The edges 1002a-1002n need not be equidistant in ordinate. In an epipolar aligned framework, ordinate difference relates to the separation between cameras, which may vary.

Figure 10B:
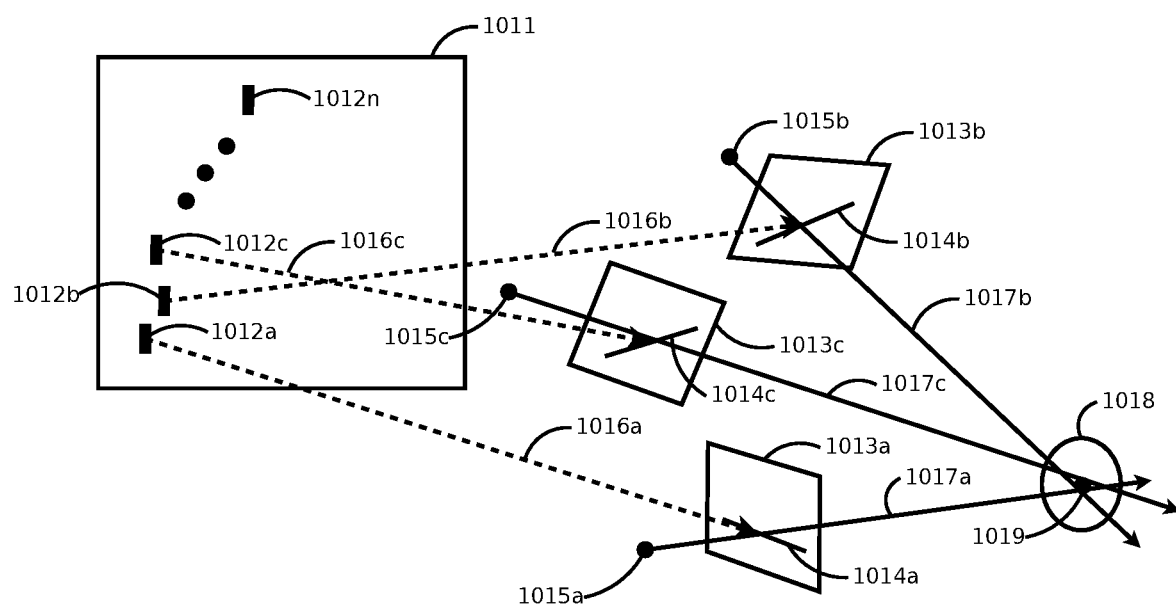
FIG. 10B is an illustrative block diagram of an embodiment of estimating the depth associated with selected edges using the rays passing through those edges and their corresponding spatial image centers of projection.

FIG. 10B is an illustrative block diagram of an embodiment of estimating the depth at the object feature associated with selected edges using the rays passing through those edges and their corresponding spatial image centers of projection. A set of edges 1012a-1012n is selected in an epipolar plane edge image 1011 that correspond to the same feature on an object. This selection may be based on the edges being part of a common contour, as described with respect to FIG. 10A. Edge 1012a is mapped back onto an epipolar line 1014a in the image plane 1013a associated with a camera having center of projection 1015a, and is then used to generate a ray 1017a. Similarly, edges 1012b-1012c are mapped back onto epipolar lines 1014b-1014c in image planes 1013b-1013c associated with cameras having centers of projection 1015b-1015c, and are then used to generate rays 1017b-1017c. This process is repeated (not shown in FIG. 10B) for other edges through 1012n. The resulting collection of rays passes through an area 1018, and it is possible to compute a point 1019 that minimizes a function of the distance from the point 1019 to each ray, and then uses the distance from that point 1019 to the centers of projection of the reference spatial image (one of 1015a-1015c) as a depth estimate for the object feature observed as edges 1012a-1012c.

The ray intersection method described with respect to FIG. 10B may be appropriate when camera separations are varying or when the variation occurs on different axes of camera placement. For both the method described with respect to FIG. 10A and the method described with respect to FIG. 10B, the solution remains linear.

Figure 11A:
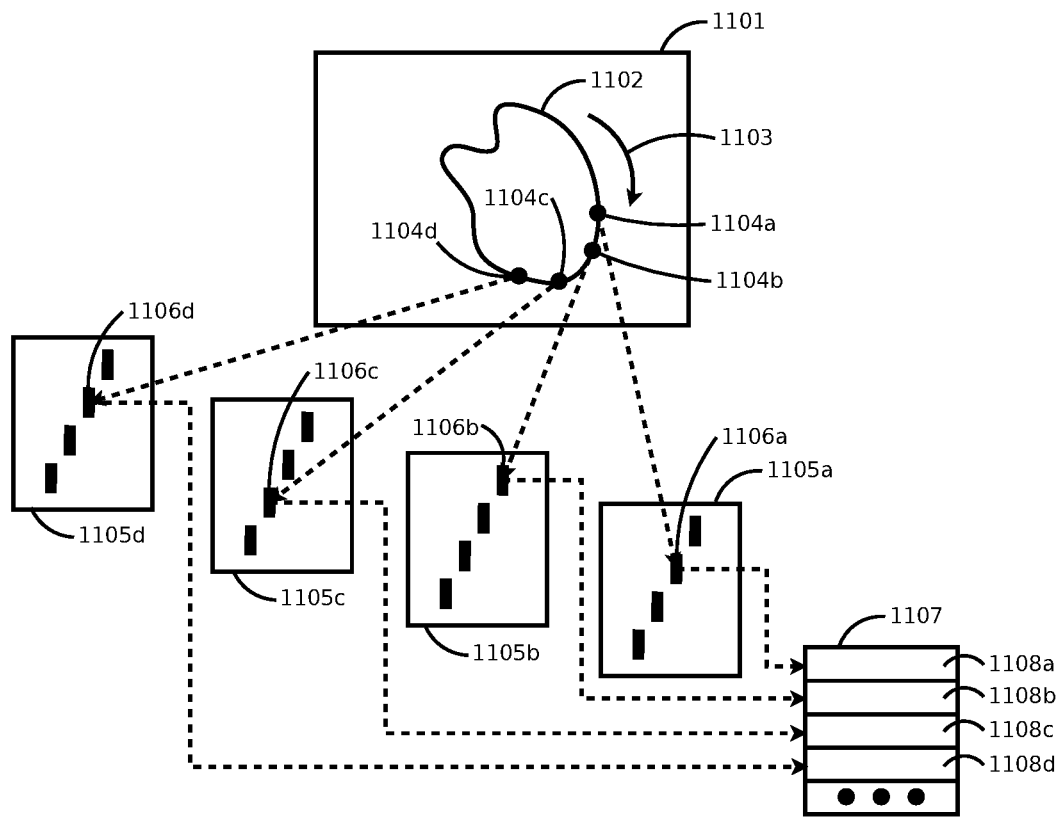
FIG. 11A is an illustrative block diagram of an embodiment of collecting a sequence of selected edges from multiple epipolar plane edge images that map to the same contour in a reference spatial edge image.

FIG. 11A is an illustrative block diagram of an embodiment of collecting a sequence of selected edges from one or more epipolar plane edge images that map to the same contour in a reference spatial edge image. The zero crossings of the second derivative of the spatial image 1101 form a contour 1102 as identified by the contour identification 227 described with respect to FIG. 2, using the method described with respect to FIG. 9C. This defines an ordering 1103 of the points on the contour 1102. The ordered points 1104a-1104d map to edges 1106a-1106d in the one or more epipolar plane edge image segments 1105a-1105d. These mapped edges 1106a-1106d are then selected as a sequence 1107 of edges 1108a-1108d. The edges 1108a-1108d that are selected facilitate the proper characterization of depth information derived from the one or more epipolar plane edge image segments 1105a-1105d as described with respect to FIG. 10A and FIG. 10B, because these edges 1108a-1108d are related to the same object and ordered by the contour 1102 derived from the original spatial edge image 1101.

Figure 11B:
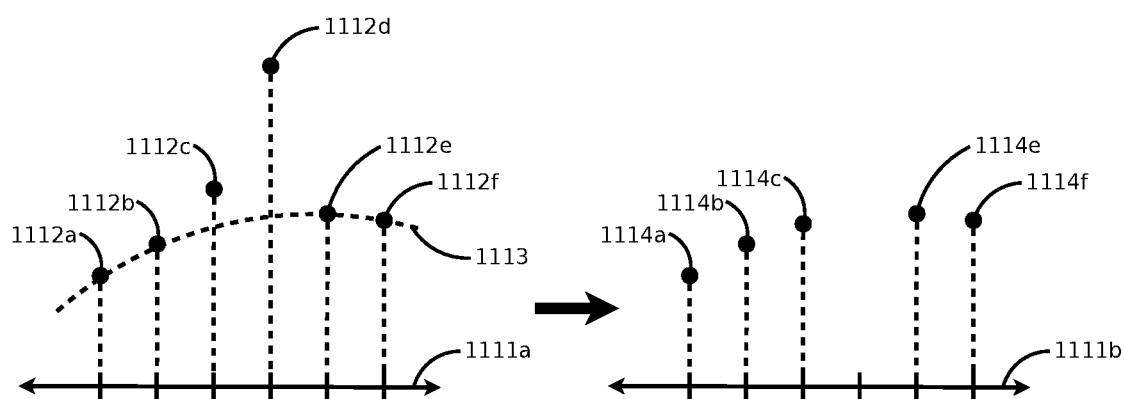
FIG. 11B is an illustrative block diagram of an embodiment of a sequence filtering function.

FIG. 11B is an illustrative block diagram of an embodiment of a sequence filtering function. The depth information associated with a sequence of edges such as a sequence derived as described with respect to FIG. 11A is represented as a discrete function of the position in the sequence. In the example embodiment of FIG. 11B, the depth values 1112a-1112f are shown as a function of the sequencing 1111a. A continuous function 1113 is fit to the points of the discrete function formed from 1112a-1112f. A sequence filtering function is then applied to the continuous function 1113. In the example embodiment depicted in FIG. 11B, the sequence filtering function rejects the value 1112d as being too far from the function 1113, and adjusts the value of 1112c downward to fit the function 1113. The resulting new sequence 1111b contains the discrete depth estimates 1114a-1114f.

Figure 11C:
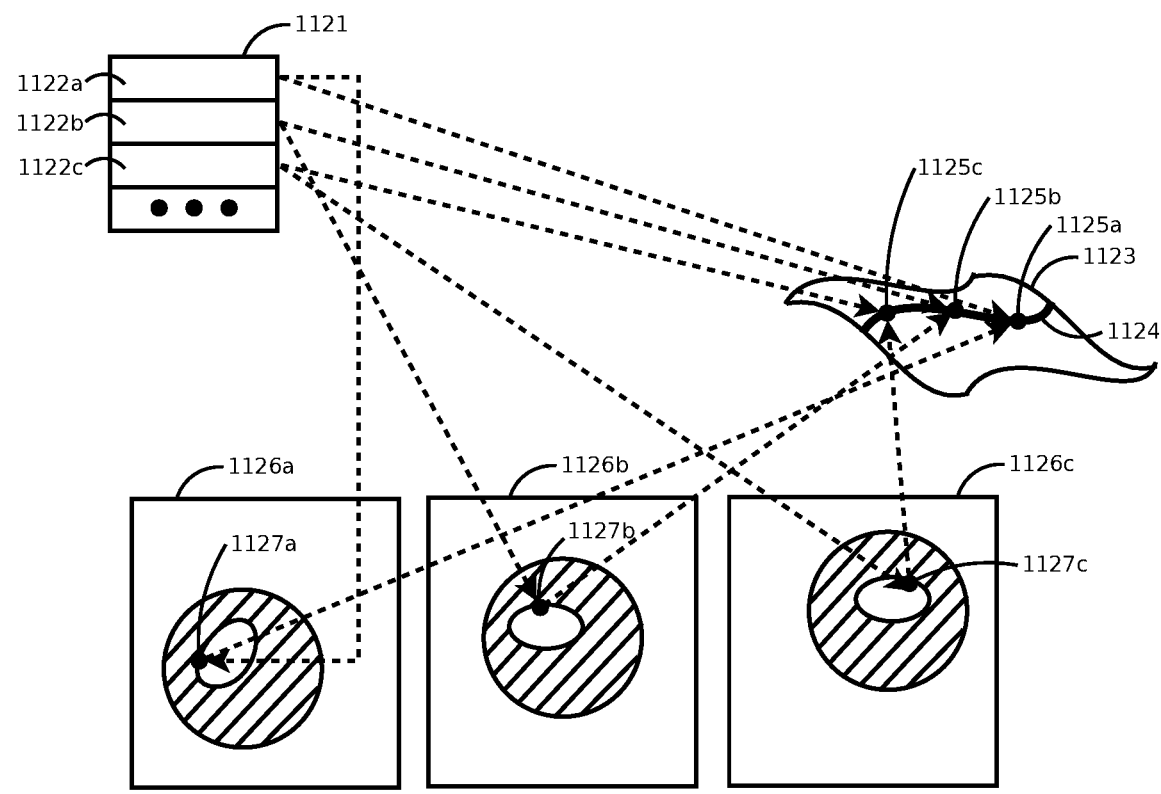
FIG. 11C is an illustrative block diagram of an embodiment of using depth estimates and mapped coordinates to create a three-dimensional representation of a surface of an object.

FIG. 11C is an illustrative block diagram of an embodiment of using depth estimates and mapped coordinates to create a three-dimensional representation of a surface of an object. The edge sequence 1121 with edges 1122a-1122c is the output of the sequence filtering function as described with respect to FIG. 11B. The depth estimates of the edges 1122a-1122c, along with the camera geometries, are used to compute the three-dimensional position of points 1125a-1125c in space. These points 1125a-1125c then represent points along a contour 1124 that are on the surface 1123 of an object in the original spatial images 1126a-1126c that were used to derive the edges 1122a-1122c. The edges 1122a-1122c are mapped to points 1127a-1127c in the spatial images 1126a-1126c, and are used to select information in the vicinity of those points 1127a-1127c such as color and luminance in order to position a texture map onto the surface 1123 at the corresponding points 1125a-1125c on the surface 1123.

Figure 12A:
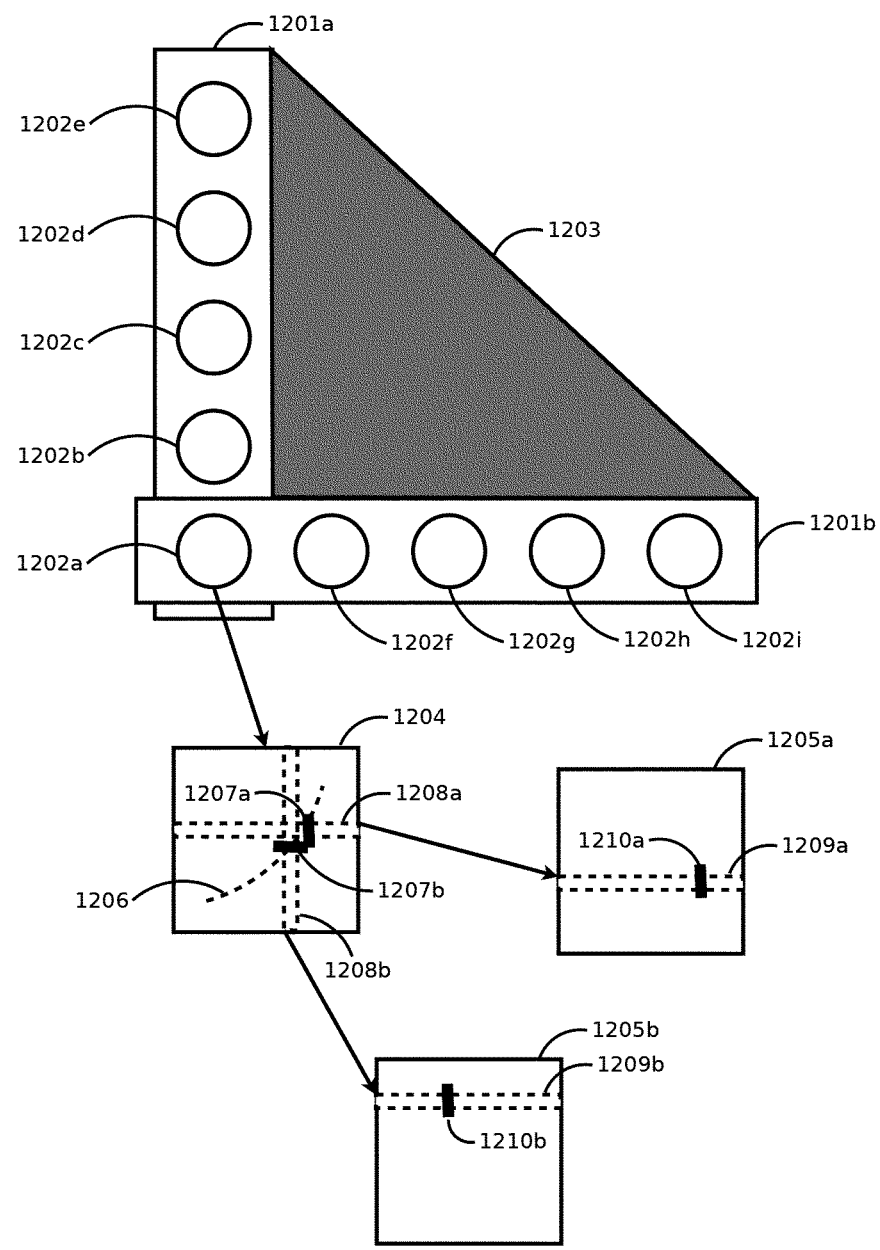
FIG. 12A is an illustrative block diagram of an embodiment of two linear camera arrays that share one camera.

FIG. 12A is an illustrative block diagram of an embodiment of two linear camera arrays that share one camera. The linear camera array 1201a includes cameras 1202a-1202e. The linear camera array 1201b includes cameras 1202a and 1202f-1202i. The cameras 1202a-1202i are oriented so that they are aimed perpendicular to the plane of the camera arrays 1201a-1201b. In other words, the cameras 1202a-1202i are aimed at the reader who is looking at FIG. 12A. The linear camera array 1201a implements the method previously described with respect to FIG. 2 to determine a three-dimensional representation of a surface of an object that is visible from a set of cameras in the array 1201a. Similarly, the linear camera array 1201b implements the method previously described with respect to FIG. 2 to determine a three-dimensional representation of a surface of an object that is visible from a set of cameras in the array 1201b. In particular, for both array 1201a and 1201b, when the image selected to be the reference spatial edge image in 214, as described with respect to FIG. 2, is the image captured by camera 1202a, shared by arrays 1201a and 1201b, then the same zero-crossing contour identified by the contour identification 227 as described with respect to FIG. 2 maps to different sets of epipolar plane edge images 1105a-1105d as described with respect to FIG. 11A, one from 1201a and one from 1201b.

The second derivative spatial image 1204 created from the image captured by camera 1202a is used as the reference spatial edge image 214 as described with respect to FIG. 2, for both the linear array 1201a and the linear array 1202b. An edge 1207a in the horizontal direction is determined using the method described with respect to FIG. 8B to determine edge 813, and an edge 1207b in the vertical direction is determined using the method described with respect to FIG. 8B to determine edge 814. A contour 1206 is identified along the edges 1207a and 1207b using the method described with respect to FIG. 9C. A segment 1208a of the second derivative spatial image 1204 is along an epipolar line for the linear array 1201b, and is used to create a segment 1209a of an epipolar plane edge image 1205a for the linear array 1201b, using the method as described with respect to FIG. 7. The segment 1209a includes the edge 1210a corresponding to the edge 1207a in the second derivative spatial image 1204. Similarly, a segment 1208b of the second derivative spatial image 1204 is along an epipolar line for the linear array 1201a, and is used to create a segment 1209b of an epipolar plane edge image 1205b for the linear array 1201a, using the method as described with respect to FIG. 7. The segment 1209b includes the edge 1210b corresponding to the edge 1207b in the second derivative spatial image 1204. Since the edges 1210a and 1210b are related through their correspondence with and adjacency on the contour 1206, the two edges are determined to be related to the same feature on an object in the scene.

These multiple mappings of contours such as 1206 and their edge elements such as 1207a-1207b in the reference second derivative spatial image 1204 derived from the reference spatial image captured by camera 1202a to epipolar plane edge images 1205a-1205b for separate linear arrays 1201a-1201b facilitate improving the depth estimates 216 described with respect to FIG. 2, and increasing the quality of the three-dimensional surface representation 217 described with respect to FIG. 2. The fact that the linear arrays 1201a-1201b cover different directions in the space of viewpoints indicates that the linear arrays 1201a-1201b provide additional information to the object modeling process, compared to what each linear array delivers independently.

A vertical zero crossing such as 1207b facilitates localizing lateral features such as the horizon or the top of a table, while a horizontal zero crossing such as 1207a facilitates localizing upright features such as the sides of doorways or the trunks of trees. Together, these differently oriented features are used in composing descriptions of some or all object shapes.

The contribution of the edge 1207b to the epipolar plane edge images for the linear array 1201a, the contribution of the edge 1207a to the epipolar plane edge images for the linear array 1201b, and the association of edge 1207a with 1207b facilitates localizing the features on surfaces of objects as though viewed from inside the area 1203 of the triangle bounded by the two linear camera arrays 1201a-1201b. In an illustrative example, it may be possible to interpolate the position of a feature viewed in both camera arrays 1201a-1201b using the fact that the feature is observed from both camera arrays 1201a-1201b and has adjacent edges in the reference second derivative spatial image 1204. The adjacent edges are used to generate a viewpoint for a virtual camera as though the camera were positioned inside the area 1203 even though the camera does not actually exist. The continuity provided in the contour representation means that this viewpoint is generated without search.

Since the camera arrays 1201a and 1201b are linear and share an imager 1202a, the camera arrays 1201a and 1201b are coplanar. For coplanar configurations, the calibration operates as described with respect to FIG. 5 to map corresponding feature observations to two straight lines simultaneously—one in horizontal projections such as 511 and one in vertical projections (not illustrated in FIG. 5). A single epipolar rectification transform computed for each image from cameras 1202a-1202i ensures that features are aligned for EPI processing in both directions simultaneously.

Figure 12B:
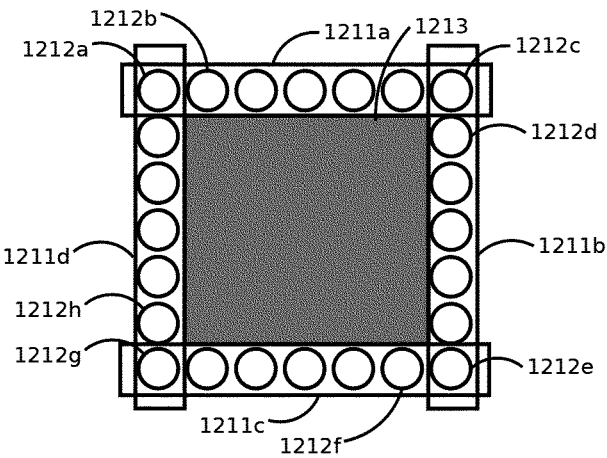
FIG. 12B is an illustrative block diagram of an embodiment of a rectangular array of cameras.

FIG. 12B is an illustrative block diagram of an embodiment of a rectangular array of cameras. The linear array 1211a includes cameras 1212a-1212c. The linear array 1211b includes cameras 1212c-1212e. The linear array 1211c includes cameras 1212e-1212g. The linear array 1211d includes cameras 1212g, 1212h, and so on through 1212a. The linear array 1211a implements the method previously described with respect to FIG. 2 to determine a three-dimensional representation of a surface of an object that is visible from a set of cameras in the array 1211a. Similarly, the linear array 1211b implements the method previously described with respect to FIG. 2 to determine a three-dimensional representation of a surface of an object that is visible from a set of cameras in the array 1211b. In particular, for both array 1211a and 1211b, if the image that is selected by the zero-crossing determination 225 to create the reference spatial edge image 214 is the image captured by camera 1212c, which is shared by array 1211a and 1211b, then the same contour identified by the contour identification 227 maps to different sets of one or more epipolar plane edge images 1105a-1105d as described with respect to FIG. 11A, and the correspondence of the edges 1106a-1106d in those one or more epipolar plane edge images 1105a-1105d is used to generate viewpoints for a virtual camera as though the camera was positioned inside the area 1213 of the rectangle but does not actually exist. Similarly, the shared camera 1212e is used to create the reference spatial edge image 214 for the one or more epipolar plane edge images 1105a-1105d created by the arrays 1211b and 1211c, the shared camera 1212g is used to create the reference spatial edge image 214 for the one or more epipolar plane edge images 1105a-1105d created by the arrays 1211c and 1211d, and the shared camera 1212a is used to create the reference spatial edge image 214 for the one or more epipolar plane edge images 1105a-1105d created by the arrays 1211d and 1211a. The redundancy created by these multiple correspondences through the multiple reference spatial images facilitates improving the depth estimates 216 as described with respect to FIG. 2, the quality of the three-dimensional surface representation 217 as described with respect to FIG. 2, and the quality of generated viewpoints for virtual cameras from inside the area 1213 that are generated from the rectangular array of cameras.

A rectangular array of cameras like the one depicted in FIG. 12B is particularly well-suited to the geometry of many displays. In one example embodiment, the central area 1213 depicted in FIG. 12B represents a computer display, and the camera arrays 1211a-1211d are included in the frame around the computer display. In another example embodiment, the central area 1213 depicted in FIG. 12B represents a television display, and the camera arrays 1211a-1211d are included in the frame around the television display. In still another example embodiment, the central area 1213 depicted in FIG. 12B represents the display of a gaming device, and the camera arrays 1211a-1211d are included in the frame around the display of the gaming device.

Figure 12C:
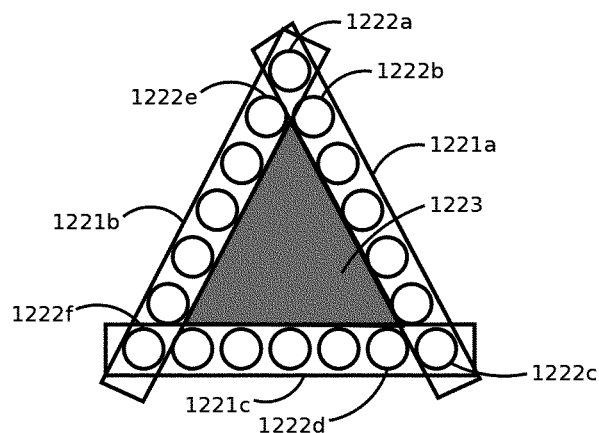
FIG. 12C is an illustrative block diagram of an embodiment of a triangular array of cameras.

FIG. 12C is an illustrative block diagram of an embodiment of a triangular array of cameras. The linear array 1221a includes cameras 1222a-1222c. The linear array 1221b includes cameras 1222a, 1222e, and so on through 1222f. The linear array 1221c includes cameras 1222c-1222f. The linear array 1221a implements the method previously described with respect to FIG. 2 to determine a three-dimensional representation of a surface of an object that is visible from a set of cameras in the array 1221a. Similarly, the linear array 1221b implements the method previously described with respect to FIG. 2 to determine a three-dimensional representation of a surface of an object that is visible from a set of cameras in the array 1221b. In particular, for both array 1221a and 1221b, if the image that is selected by the zero-crossing determination 225 to create the reference spatial edge image 214 is the image captured by camera 1222a, which is shared by array 1221a and 1221b, then the same contour identified by the contour identification 227 maps to different sets of one or more epipolar plane edge images 1105a-1105d as described with respect to FIG. 11A, and the correspondence of the edges 1106a-1106d in those one or more epipolar plane edge images 1105a-1105d is used to generate viewpoints for a virtual camera as though the camera was positioned inside the area 1203 of the triangle but does not actually exist. Similarly, the shared camera 1222c is used to create the reference spatial edge image 214 for the one or more epipolar plane edge images 1105a-1105d created by the arrays 1221a and 1221c, and the shared camera 1222f is used to create the reference spatial edge image 214 for the one or more epipolar plane edge images 1105a-1105d created by the arrays 1221b and 1221c. The redundancy created by these multiple correspondences through the multiple reference spatial images facilitates improving the depth estimates 216 as described with respect to FIG. 2, the quality of the three-dimensional surface representation 217 as described with respect to FIG. 2, and the quality of generated viewpoints for virtual cameras from inside the area 1223 that are generated from the triangular array of cameras.

A triangular array of cameras like the one depicted in FIG. 12C may be used to tile the surface of a sphere as a geodesic. As an illustrative example, the triangles may be used to create an icosahedron that forms a spherical surface tiled by cameras. This arrangement facilitates creating a camera array with linear segments that provide a full view of the entire environment, recovering both range and panoramic images. The linear camera arrays along the straight segments facilitate improving range information with the characteristics discussed above, and the shared cameras at every vertex of the icosahedron facilitates the integration of these depth estimates over the full geodesic. The combination of depth and imagery over the geodesic facilitates improving the determination of surface representations of objects throughout the environment's full 360-degrees of azimuth and elevation.

Figure 12D:
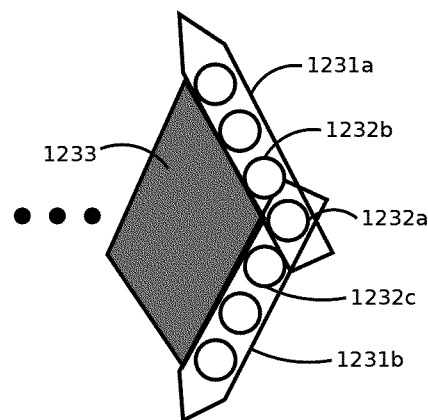
FIG. 12D is an illustrative block diagram of an embodiment of a polygonal array of cameras.

FIG. 12D is an illustrative block diagram of an embodiment of a polygonal array of cameras. The linear array 1231a includes cameras 1232a, 1232b, and so on. The linear array 1231b includes cameras 1232a, 1232c, and so on. The linear array 1231a implements the method previously described with respect to FIG. 2 to determine a three-dimensional representation of a surface of an object that is visible from a set of cameras in the array 1231a. Similarly, the linear array 1231b implements the method previously described with respect to FIG. 2 to determine a three-dimensional representation of a surface of an object that is visible from a set of cameras in the array 1231b. In particular, for both array 1231a and 1231b, if the image that is selected by the zero-crossing determination 225 to create the reference spatial edge image 214 is the image captured by camera 1232a, which is shared by array 1231a and 1232b, then the same contour identified by the contour identification 227 maps to different sets of one or more epipolar plane edge images 1105a-1105d as described with respect to FIG. 11A, and the correspondence of the edges 1106a-1106d in those one or more epipolar plane edge images 1105a-1105d is used to match features on surfaces of objects that are viewed inside the area 1233 of the polygon. This method is repeated for some or all of the vertices of the polygon, where a shared camera is included in two linear arrays of cameras. The redundancy created by these multiple correspondences through the multiple reference spatial images facilitates improving the depth estimates 216 as described with respect to FIG. 2, the quality of the three-dimensional surface representation 217 as described with respect to FIG. 2, and the quality of generated viewpoints for virtual cameras from inside the area 1233 that are generated from the polygonal array of cameras.

Figure 13:
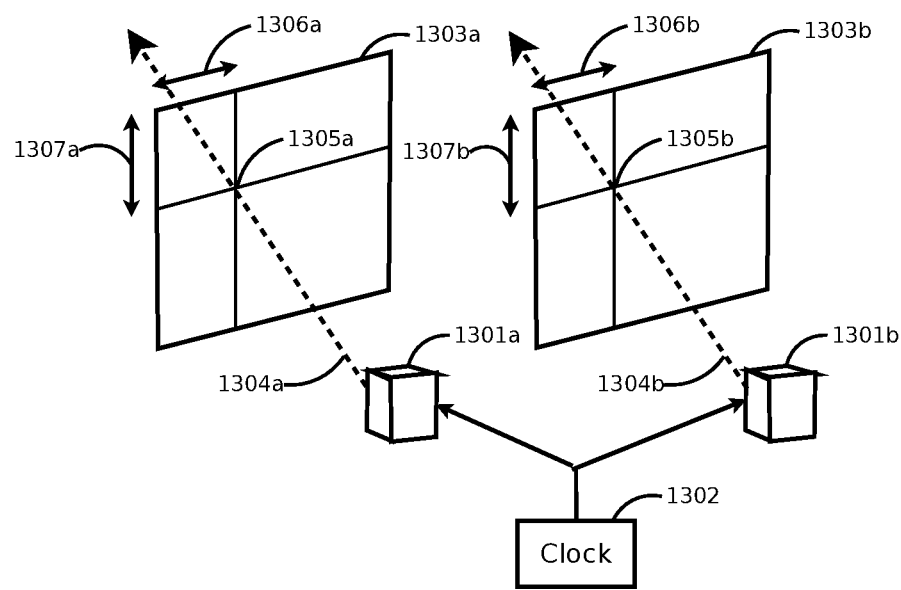
FIG. 13 is an illustrative block diagram of an embodiment of pixel synchronization in two cameras.

FIG. 13 is an illustrative block diagram of an embodiment of pixel synchronization in two cameras. In environments where either the cameras are moving or objects in the environment are moving, the method described with respect to FIG. 2 is facilitated by using spatial images in which the moving parts of the multiple images are captured at the same time, so that the objects in the multiple images correspond. In the example embodiment depicted in FIG. 13, the two cameras 1301a and 1301b generate the two spatial images 1303a and 1303b by scanning on the horizontal and vertical axes of the images 1303a and 1303b. In order to capture the corresponding points 1305a and 1305b at the same time, the horizontal scanning offsets 1306a and 1306b should be the same, and the vertical scanning offsets 1307a and 1307b should also be the same. This synchronization is achieved by using a single clock source 1302 for the two cameras 1301a and 1301b, which generates both the horizontal and vertical scanning clocks, so that the rays 1304a and 1304b scanned by the cameras 1301a and 1301b remain synchronized. Although the embodiment depicted in FIG. 13 shows pixel synchronization for two cameras 1301a and 1301b, the method is extended in the same way to provide pixel synchronization for any number of cameras at the same time.

Figure 14:
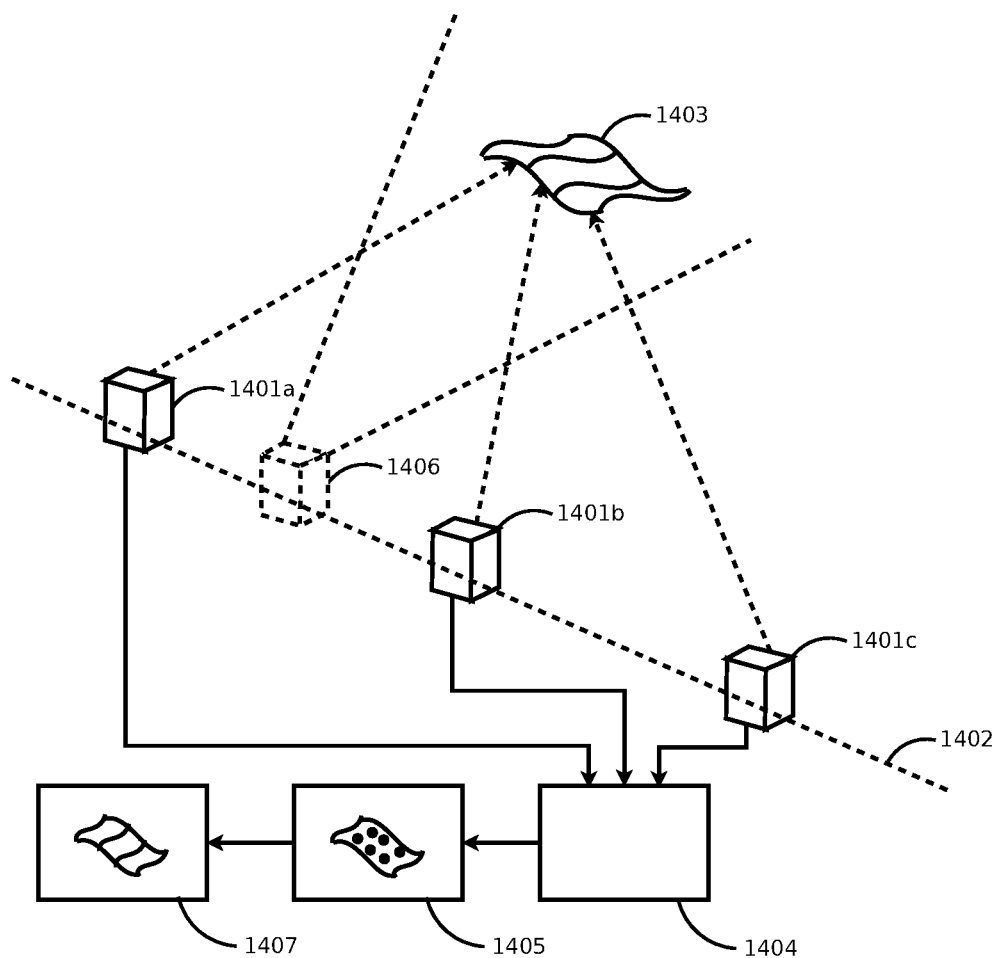
FIG. 14 is an illustrative block diagram of an embodiment of synthesizing an image produced from an intermediate viewpoint.

FIG. 14 is an illustrative block diagram of an embodiment of synthesizing an image produced from an intermediate viewpoint. Cameras 1401a-1401c are aligned on a straight line 1402 and may therefore be used with the method described with respect to FIG. 2 to determine a three-dimensional representation of a surface of an object. In the example embodiment depicted in FIG. 14, module 1404 uses images from cameras 1401a-1401c to create a three-dimensional model 1405 of an object 1403. The three-dimensional model 1405 is then used to synthesize an image 1407 of the object 1403 as it would appear if it were viewed from a camera 1406 that does not actually exist.

In one embodiment of the synthesis of the image 1407, intersecting lines in the epipolar edge images, such as 924a and 924b as described with respect to FIG. 9C, are used to facilitate the quality of the view interpolation. The intersection 925 is considered as an edge of an occluding feature in the scene, which lies in front of and occludes a scene feature associated with the other line in the intersection 925. The image interpolation process uses this information to select image content for the image 1407.

In one embodiment, there are one or more sets of additional linear camera arrays aligned in a direction different from that of 1402. These camera arrays provide additional views of object 1403 from additional positions and orientations. These additional views are combined using the method described with respect to FIG. 12A-FIG. 12D to facilitate improving the depth estimates 216 and the quality of the three-dimensional surface representation 217, as described with respect to FIG. 2, generated from the array of cameras.

In one embodiment, additional models similar to 1405 of additional objects in the environment such as 1403 are combined to synthesize a scene 1407 containing representations of the objects. In another embodiment, the association of the object models such as 1405 to the original spatial images captured by cameras 1401a-1401c is used to map textures from the spatial images onto the synthesized objects to facilitate the realism of the synthesized image 1407. In another embodiment, the object models such as 1405 are used to determine which areas of the original spatial images are obscured in the synthesized viewpoint 1406, and unobscured sections of the spatial images captured by cameras 1401a-1401c are transformed and combined to create the synthesized image 1407. In still another embodiment, aspects of the synthesis methods described here are combined to create the synthesized image 1407.

In one embodiment, the method described with respect to FIG. 14 facilitates film and video directors by providing additional camera angles during post-production that were not explicitly specified during filming. In another embodiment, the method described with respect to FIG. 14 facilitates creating camera angles in real time that are controlled by the motion of an observer in a virtual reality display system.

Figure 15:
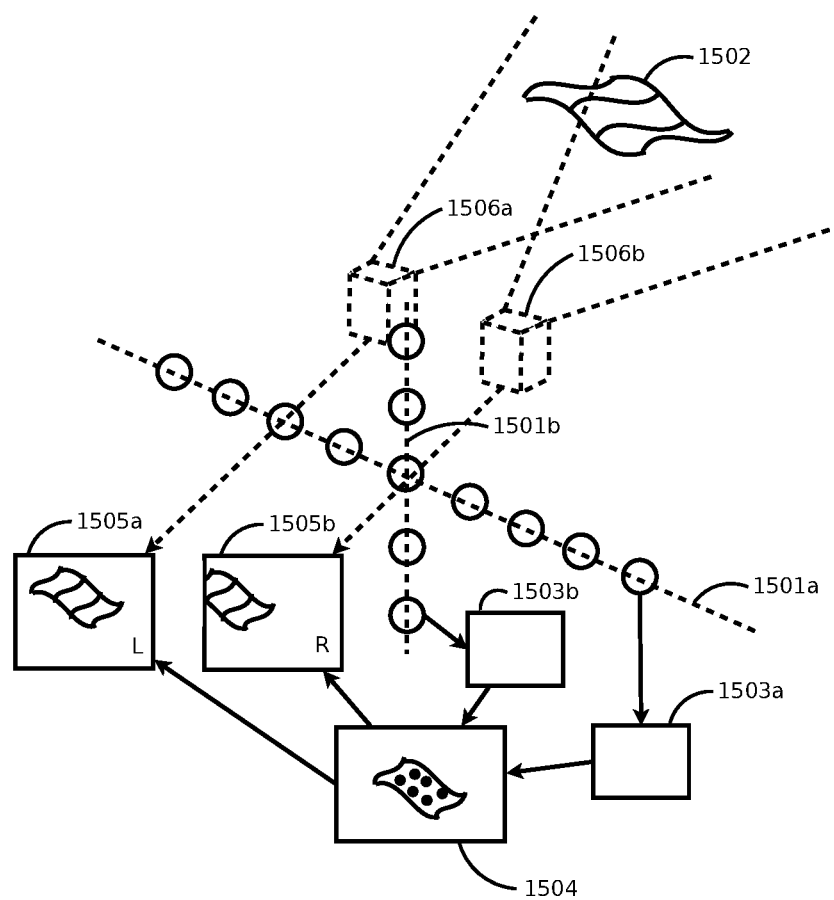
FIG. 15 is an illustrative block diagram of an embodiment of producing a three-dimensional image.

FIG. 15 is an illustrative block diagram of an embodiment of producing a three-dimensional image. Linear arrays 1501a and 1501b of cameras are used with the method described with respect to FIG. 2 and FIG. 12A to determine a three-dimensional representation of a surface of an object. In the example embodiment depicted in FIG. 15, module 1503a uses images from the linear array 1501a of cameras, and module 1503b uses images from the linear array 1501b of cameras, to create a three-dimensional model 1504 of an object 1502. Using the method described previously with respect to FIG. 14, two images 1505a and 1505b are synthesized as they would appear from two virtual cameras 1506a and 1506b that do not actually exist. The position and orientation of the two virtual cameras 1506a and 1506b are chosen in such a way that the two images 1505a and 1505b serve as left and right images in a stereo three-dimensional display. As previously described with respect to FIG. 12A, the orientations of arrays 1501a and 1501b is chosen with a shared camera to facilitate the creation of an accurate object model 1504, and facilitate improved quality of the synthesized images 1505a and 1505b.

In one embodiment, the method described with respect to FIG. 15 facilitates the production of three-dimensional films and videos allowing adjustment of the stereo parameters during post-production rather than requiring them to be explicitly specified during filming. In another embodiment, the method described with respect to FIG. 15 facilitates creating three-dimensional images in real time that are controlled by the motion of an observer in a virtual reality display system.

Figure 16:
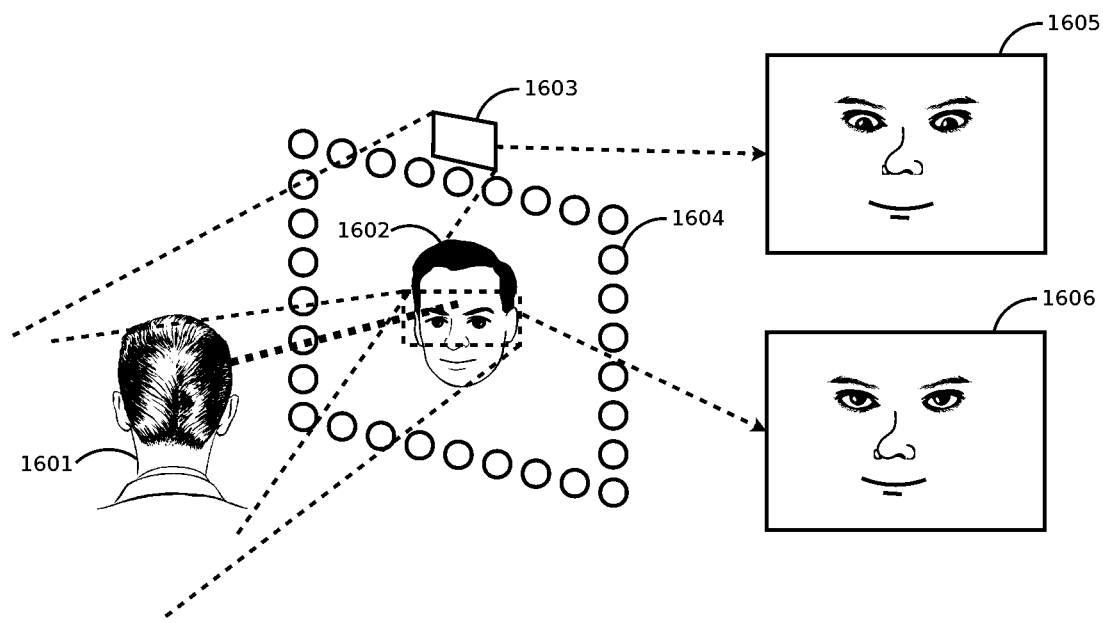
FIG. 16 is an illustrative block diagram of an embodiment of producing a gaze-corrected image for videoconferencing.

FIG. 16 is an illustrative block diagram of an embodiment of producing a gaze-corrected image for videoconferencing. One side of a videoconference is shown in which the local party 1601 sees an image 1602 of the remote party on a display. The camera placement 1603 is relatively standard, for example, many laptop computers have a camera above the screen. However, this camera placement results in an image 1605 of the local party 1601 because the local party 1601 is looking at the image 1602 of the remote party rather than the camera 1603, so the gaze of the local party 1601 is below the camera. As a result, the two parties may both feel that the other party is not really looking at them, which may be disconcerting. Using a rectangular perimeter of linear camera arrays 1604 as described with respect to FIG. 12B, and using the method described with respect to FIG. 14 to synthesize an image as though taken from an area 1602 near the eyes of the remote party on the display results in a gaze-corrected image 1606 of the local party for presentation to the remote party that feels more natural and similar to what one would experience in a real face-to-face conversation.

In one embodiment, the location of the virtual camera 1602 is determined by using images from the camera array 1604 to generate models of the eyes and pupils of the local party, determining the gaze from those models, and finding the intersection of the gaze with the display. In another embodiment, the location of the virtual camera 1602 is determined by using a camera array (not shown in FIG. 16) at the remote party to generate a model of the eyes and pupils of the remote party, and determining where the eyes of the remote party are directed in the display of the local party. In another embodiment, the location of the virtual camera 1602 is specified programmatically using an application that positions the display of the remote party on the local party's screen.

Figure 17:
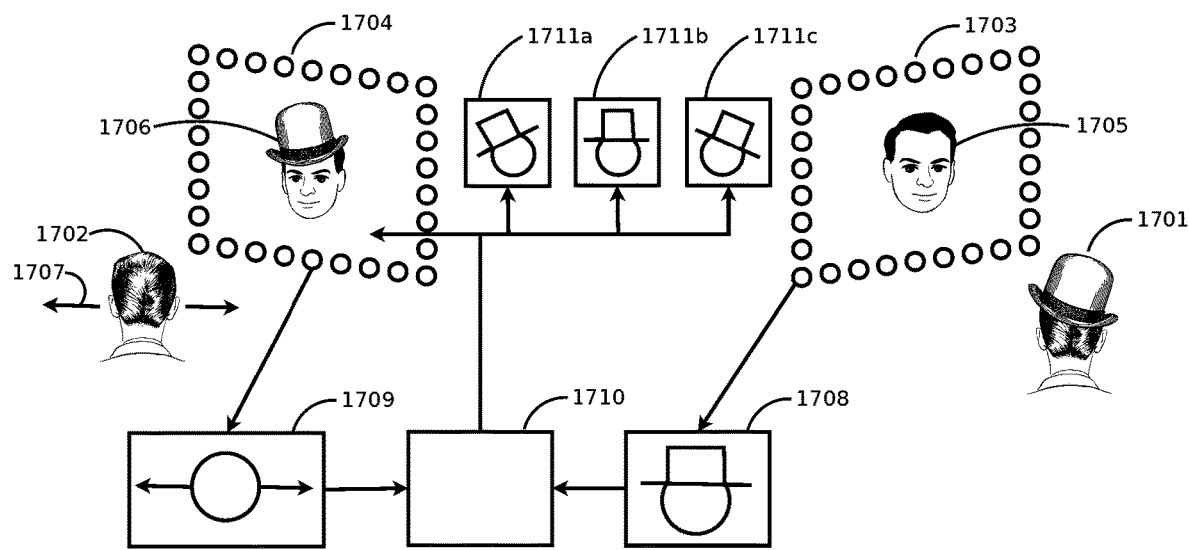
FIG. 17 is an illustrative block diagram of an embodiment of producing motion stereo.

FIG. 17 is an illustrative block diagram of an embodiment of producing motion stereo. A camera array 1703 at a remote site captures images of a remote user 1701 and creates models 1708 of objects in the scene using the method described with respect to FIG. 2. A local user 1702 has a camera array 1704 around a display that shows an image 1706 of the remote user, and the camera array 1704 captures images of the local user 1702 and create models 1709 of the objects in the scene using the method describe with respect to FIG. 2. If the local user 1702 moves his or her head 1707, a display unit 1710 determines the motion from the models 1709, and uses the method described with respect to FIG. 14 to synthesize different images 1711a-1711c using the object models 1708 of the remote user 1701, and then display the different images 1711a-1711c as the image 1706 of the remote user. This display of different perspectives depending on the motion 1707 of the local user 1702 is called motion stereo, and gives the illusion that the image 1706 of the remote user is three-dimensional, even though the actual display is only two-dimensional.

In one embodiment, the method described for generating the motion stereo image 1706 of the remote user is also used to generate the image 1705 of the local user, so that motion stereo illusion also works for the remote user 1701.

Figure 18A:
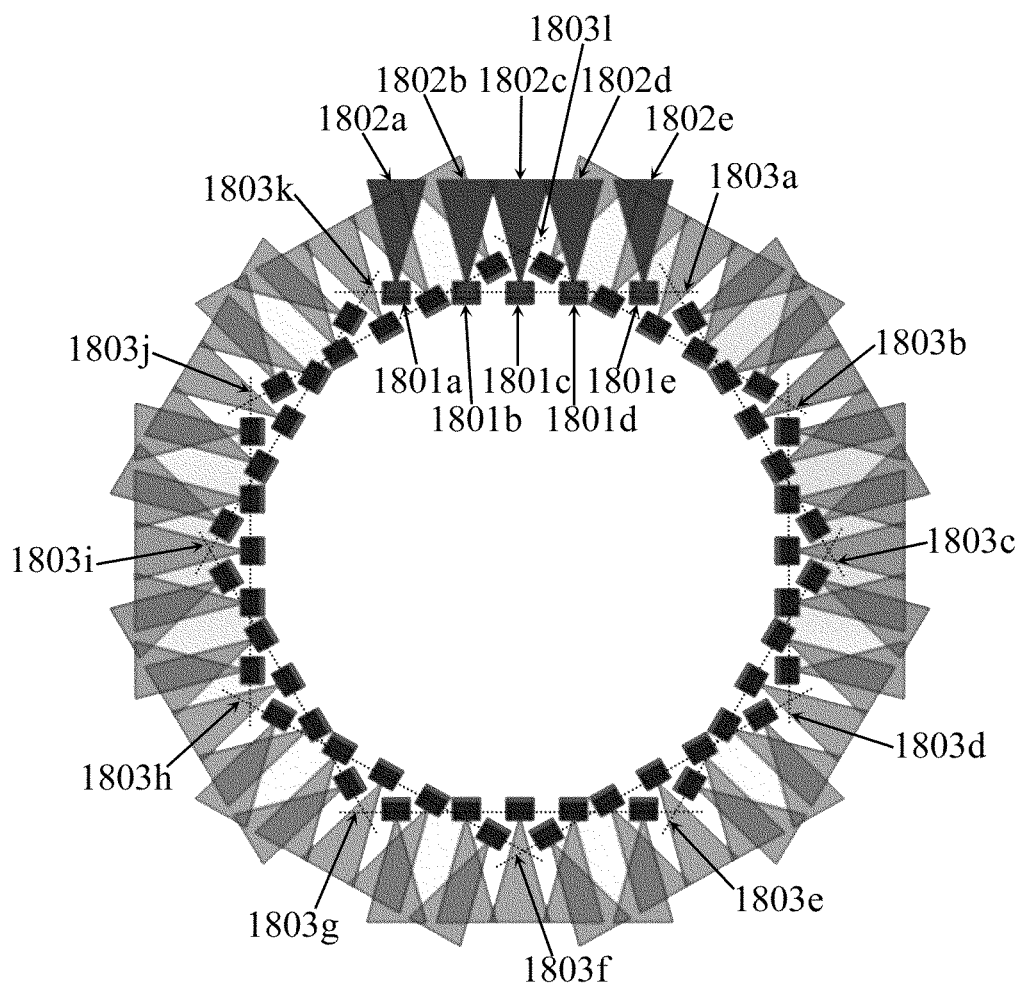
FIG. 18A is an illustrative block diagram of an embodiment of a cylindrical camera array.

FIG. 18A is an illustrative block diagram of an embodiment of a cylindrical camera array. The cameras 1801a-1801e are arranged along a straight line 1803a. The fields of view of cameras 1801a-1801e are shown by 1802a-1802e. The fields of view 1802a-1802e cover a region with overlap, so with their positioning along the straight line 1803a, the cameras 1801a-1801e are used for the method described with respect to FIG. 2 to determine three-dimensional models of the objects in the field of view. Note that this method can be used even though the centers of projection of the cameras 1801a-1801e are not evenly spaced along the straight line 1803a in which case the depth estimation method of FIG. 10B could be used rather than the method of FIG. 10A. The same structure is repeated with the camera arrays configured along straight lines 1803b-1803l, which results in an overall structure that provides coverage of the entire 360-degree environment around the camera array.

Figure 18B:
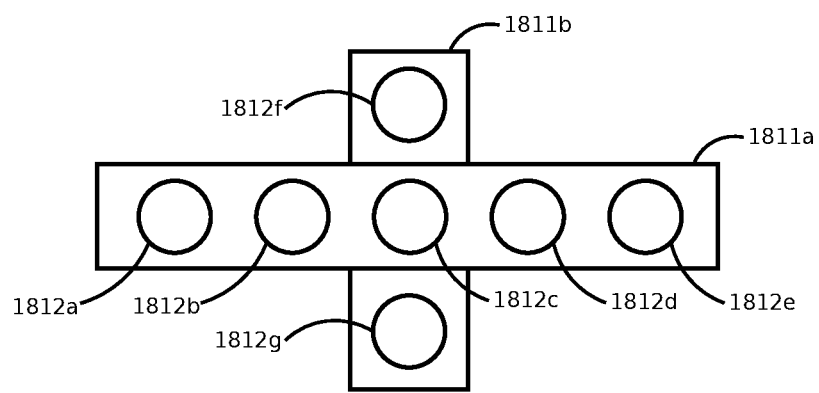
FIG. 18B is an illustrative block diagram of an embodiment of a linear camera array supplemented with a second linear camera array in an orthogonal direction.

FIG. 18B is an illustrative block diagram of an embodiment of a linear camera array supplemented with a second linear camera array in an orthogonal direction. The linear array of cameras 1811a includes cameras 1812a-1812e. This array is supplemented by a second linear array 1811b which includes cameras 1812f, 1812c, and 1812g. The linear arrays 1811a and 1811b share camera 1812c. In one embodiment, the configuration of cameras illustrated in FIG. 18B is used with the method described with respect to FIG. 12A. In one embodiment, the cameras 1812a-1812g are not evenly spaced along the linear arrays 1811a and 1811b.

In one embodiment, the linear camera array 1811a is used for the camera arrays 1803a-1803l as described with respect to FIG. 18A. In this configuration, the orthogonal linear camera array 1811b is parallel to the axis of the cylinder of FIG. 18A. In other words, as the reader is looking at FIG. 18A, camera 1812f is coming up out of the page toward the reader, and camera 1812g is going down into the page going away from the reader, while they both are looking outward from the center in the plane of the page, with view directions orthogonal to their baseline. In this embodiment, the three-dimensional information determined by the method described with respect to FIG. 2 has the advantages associated with additional directions of view, as described with respect to FIG. 14. These advantages include localizing scene features in multiple directions and generating viewpoints for virtual cameras as though they were positioned inside the area spanned by the camera arrays but do not actually exist.

Figure 18C:
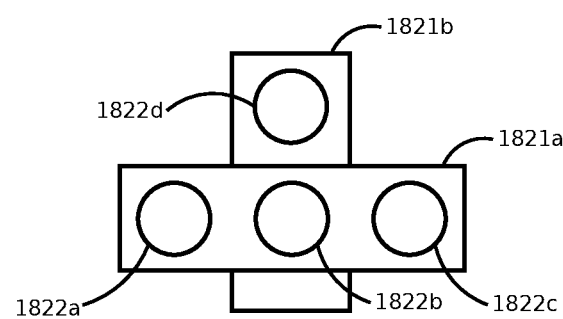
FIG. 18C is an illustrative block diagram of an embodiment of a linear camera array supplemented with a second linear camera array in an orthogonal direction.

FIG. 18C is an illustrative block diagram of an embodiment of a linear camera array supplemented with a second linear camera array in an orthogonal direction. The linear camera array 1821a is supplemented with a second linear camera array 1821b oriented in an orthogonal direction that contains fewer than three imagers 1822b and 1822d. This configuration is also a redundant system, making it appropriate for EPI analysis. As described with respect to FIG. 12A, the two linear arrays 1821a and 1821b share an imager 1822b so the two linear arrays 1821a and 1821b are coplanar. Analogous to the way that two cameras provide a minimal configuration for linear array ranging and three cameras make linear array ranging a redundant over-determined system, three non-collinear cameras provide a minimal configuration for planar array ranging and four cameras make planar array ranging a redundant system. In the example embodiment depicted in FIG. 18C, the linear array 1821a is over-determined in one dimension with three cameras, and the linear array 1821b makes a coplanar array that is over-determined in two dimensions with the addition of a single camera to make a total of four cameras. It should be understood that while the configuration depicted in FIG. 18C is a minimal configurations for redundant imaging, other configurations with additional cameras may facilitate better results.

In one embodiment, the camera array described with respect to FIG. 18A, FIG. 18B, and FIG. 18C is used with the method described with respect to FIG. 14 to record information in an environment, and then synthesize an image sequence from a virtual camera that is unconstrained to move with any position and orientation within the environment. In another embodiment, the information recorded in the environment is used with the method described with respect to FIG. 15 to synthesize a stereo three-dimensional image sequence from a virtual stereo viewpoint that is unconstrained to move with any position and orientation within the environment.

Figure 19A:
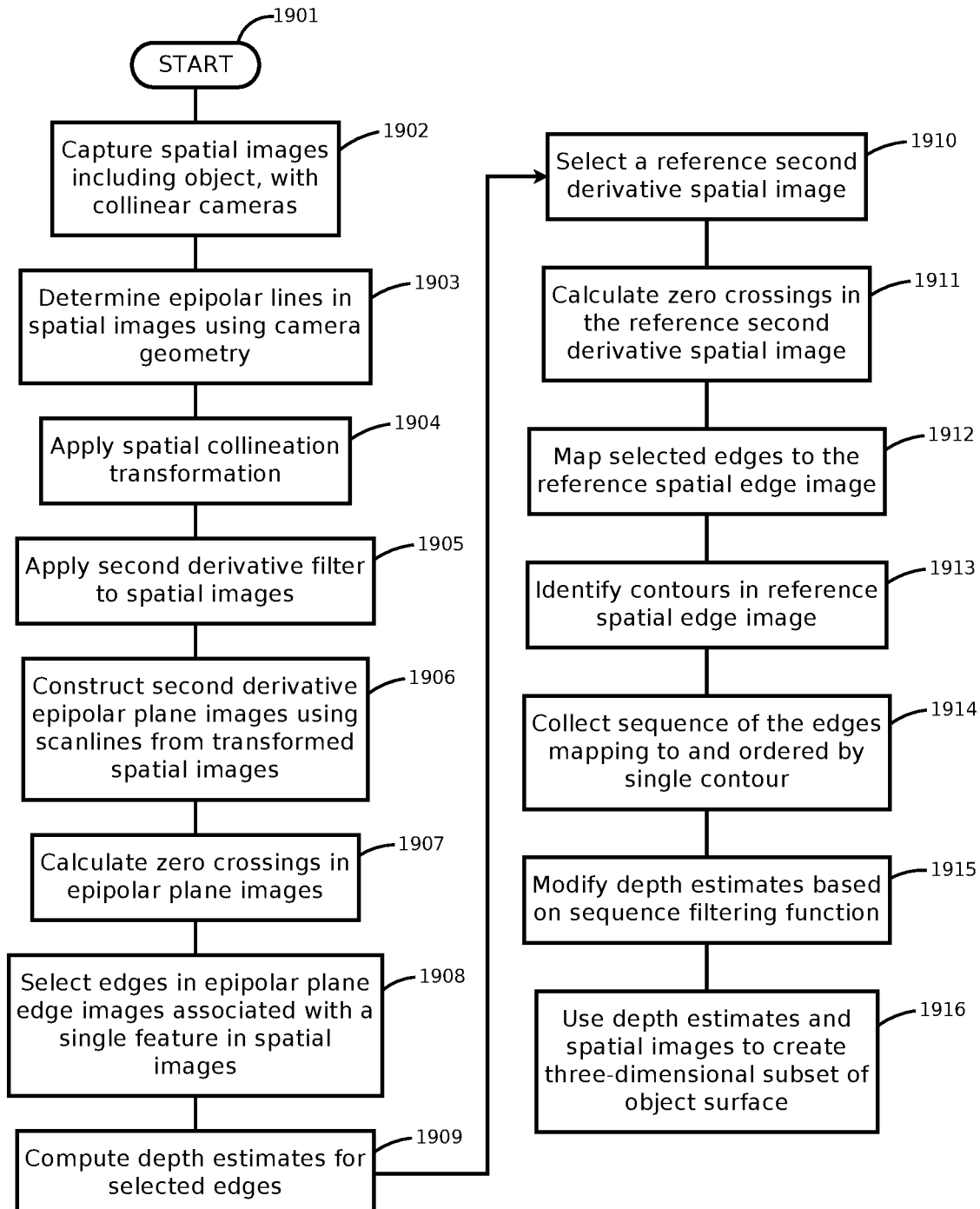
FIG. 19A is an illustrative flowchart depicting one embodiment of a method of determining a three-dimensional representation of a surface of an object from a set of images.

FIG. 19A is an illustrative flowchart depicting one embodiment of a method of determining a three-dimensional representation of a surface of an object from a redundant set of images. The method 1091 includes capturing a redundant set of spatial images using a set of cameras; each spatial image including a representation of a subset of the object, and the set of cameras being collinear (1902). The method 1901 includes using known camera geometry to determine an epipolar line in each spatial image that lies in the same epipolar plane containing a feature on the object (1903). The method 1901 includes applying a spatial collineation transformation, based on the known camera geometry, to the redundant set of spatial images to create a set of transformed spatial images (1904). The method 1901 includes applying a second derivative filter to the set of transformed spatial images to create a set of second derivative spatial images (1905). The method 1901 includes constructing one or more second derivative epipolar plane images using the values in the set of second derivative images along the epipolar lines in each spatial image as values along parallel lines in the second derivative epipolar plane images (1906). The method 1901 includes calculating interpolated zero crossings in the second derivative epipolar plane images to form one or more epipolar plane edge images (1907). The method 1901 includes selecting edges in the epipolar plane edge images that represent a single image feature in the redundant set of spatial images (1908). The method 1901 includes computing depth estimates associated with the selected edges in the epipolar plane edge images (1909). The method 1901 includes selecting a reference second derivative spatial image (1910). The method 1901 includes calculating interpolated zero crossings in the reference second derivative spatial image to form a reference spatial edge image (1911). The method 1901 includes mapping the selected edges in the epipolar plane edge images to edges in the reference spatial edge image (1912). The method 1901 includes identifying contours in the reference spatial edge image (1913). The method 1901 includes collecting a sequence of the selected edges in the epipolar plane edge images that map to the same contour in the reference spatial edge image, the ordering of the sequence corresponding to the order of the mapped coordinates along the contour (1914). The method 1901 includes modifying the depth estimates associated with the edges in the sequence, based on a sequence filtering function (1915). The method 1901 includes using the depth estimates associated with the edges in the sequence and the mapped coordinates associated with the edges in the sequence to create a three-dimensional representation of a surface of the object (1916).

Figure 19B:
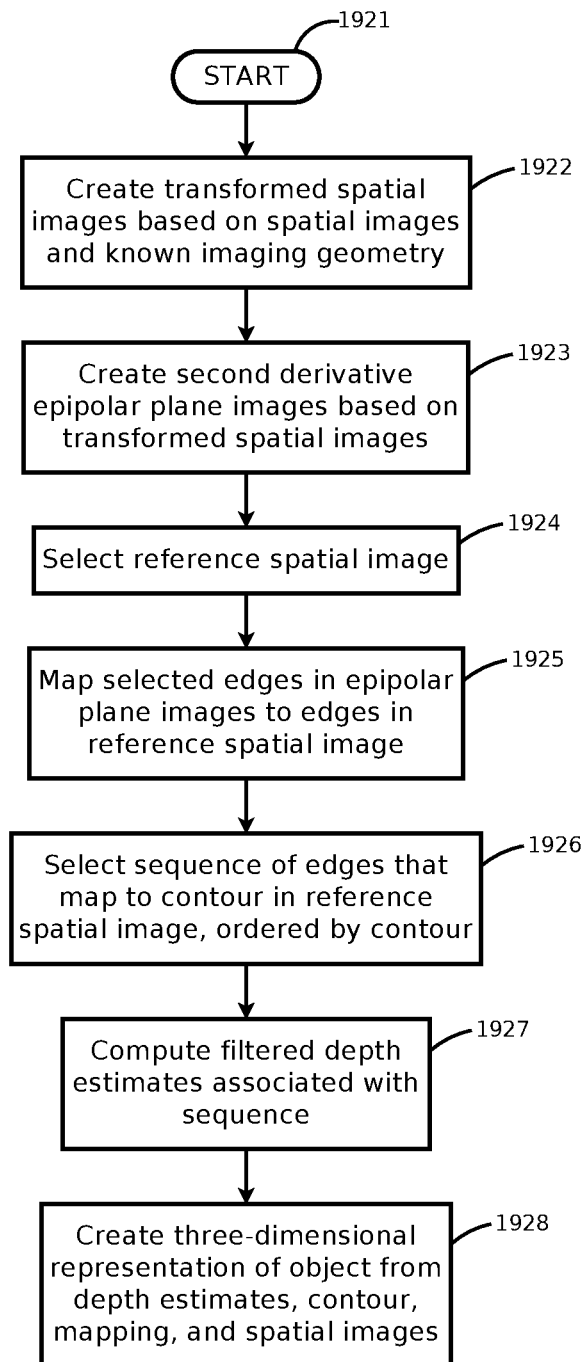
FIG. 19B is an illustrative flowchart depicting one embodiment of a method of determining a three-dimensional representation of a surface of an object from a set of images.

FIG. 19B is an illustrative flowchart depicting one embodiment of a method of determining a three-dimensional representation of a surface of an object from a redundant set of images. The method 1921 includes creating transformed spatial images based on spatial images and a known imaging geometry (1922). The method 1921 includes creating second derivative epipolar plane images based on the transformed spatial images (1923). The method 1921 includes selecting a reference spatial image (1924). The method 1921 includes mapping selected edges in the epipolar plane images to edges in the reference spatial image (1925). The method 1921 includes selecting a sequence of edges that maps to a contour in the reference spatial image, ordered by the contour (1926). The method 1921 includes computing filtered depth estimates associated with the sequence of edges (1927). The method 1921 includes creating a three-dimensional representation of an object from the depth estimates, the contour, the mapping, and the spatial images (1928).

Figure 20A:
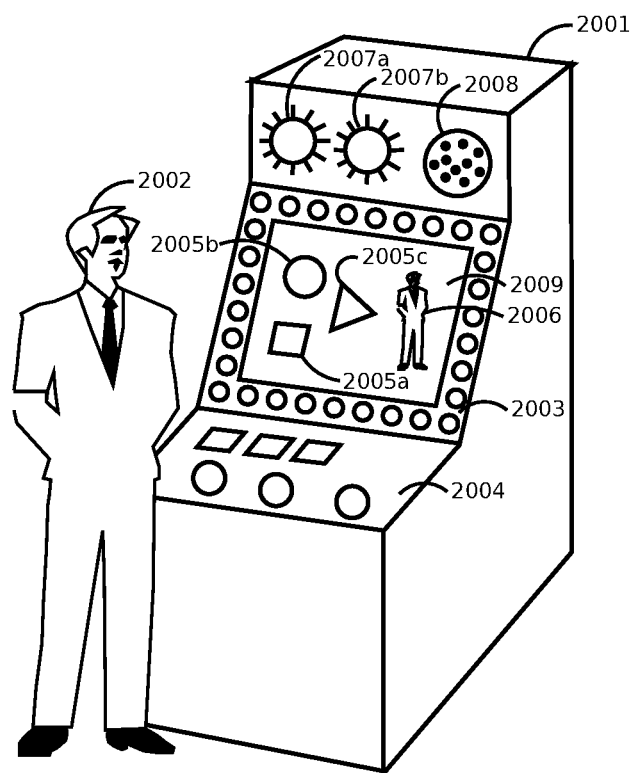
FIG. 20A is illustrative block diagram of an embodiment of a gaming machine.

FIG. 20A is an illustrative block diagram of an embodiment of a gaming machine. A gaming machine 2001 includes a display 2009, decorative lighting 2007a-2007b, an audio speaker 2008, and a control panel 2004 that allows interaction by a player 2002. The gaming machine 2001 uses the display 2009 to show game elements 2005a-2005c and 2006 in response to input from the player 2002. The gaming machine 2001 incorporates a rectangular array of cameras 2003 with shared cameras at the corners, around the display 2009. This rectangular array 2003 uses the method as described with respect to FIG. 12B to create a three-dimensional model of the player 2002 and features of the player such as eyes, pupils, and mouth, which are used to model the emotional state of the player 2002. The gaming machine 2001 then determines the responses of the game elements 2005a-2005c in a way that makes the game seem much more responsive to the player 2002. The gaming machine 2001 controls a character 2006 in the game that responds in lifelike and compelling ways, because the gaming machine 2001 has a good model of the motion, position, and emotional state of the player 2002. The gaming machine 2001 also controls the lighting 2007a and 2007b and sound 2008 to respond appropriately to the player 2002, which may increase the player's enjoyment of the game.

Figure 20B:
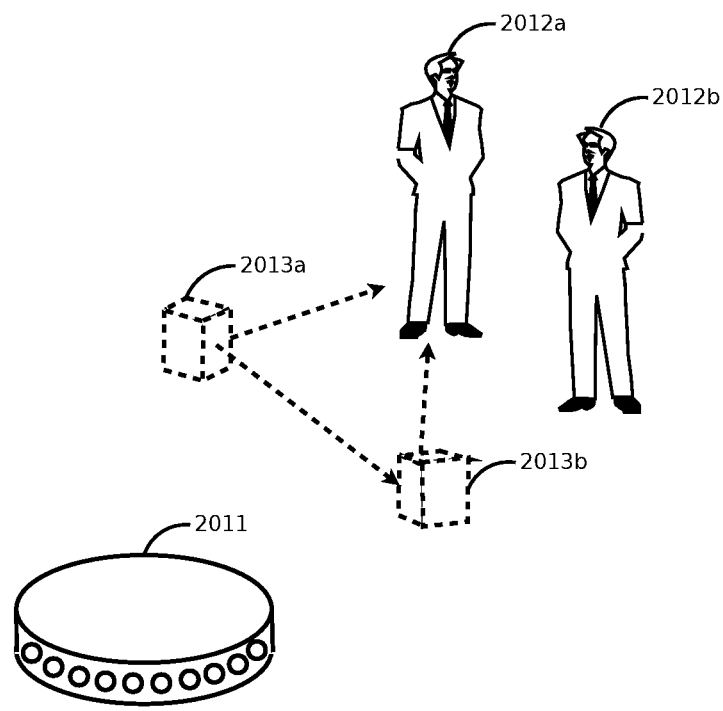
FIG. 20B is illustrative block diagram of an embodiment of a videography system.

FIG. 20B is an illustrative block diagram of an embodiment of a videography system. A 360-degree camera system 2011 records video of a scene with actors 2012a and 2012b. After reviewing the scene in the context of the entire production, the director may decide that the scene will work best if it is filmed from a moving vantage point that starts with the camera in position and orientation 2013a and moves to the position and orientation 2013b. The camera system 2011 is a cylindrical camera as described with respect to FIG. 18A, with orthogonal imaging elements as described with respect to FIG. 18B. This camera system allows using the method described with respect to FIG. 15 to synthesize images as viewed from virtual camera positions and orientations such as those depicted by 1506a and 1506b. As a result, even though the scene was recorded from a fixed vantage point by the camera system 2011, the director can choose an arbitrary camera trajectory, such as the trajectory represented by 2013a and 2013b, and synthesize the images that would have been recorded along that trajectory.

Figure 20C:
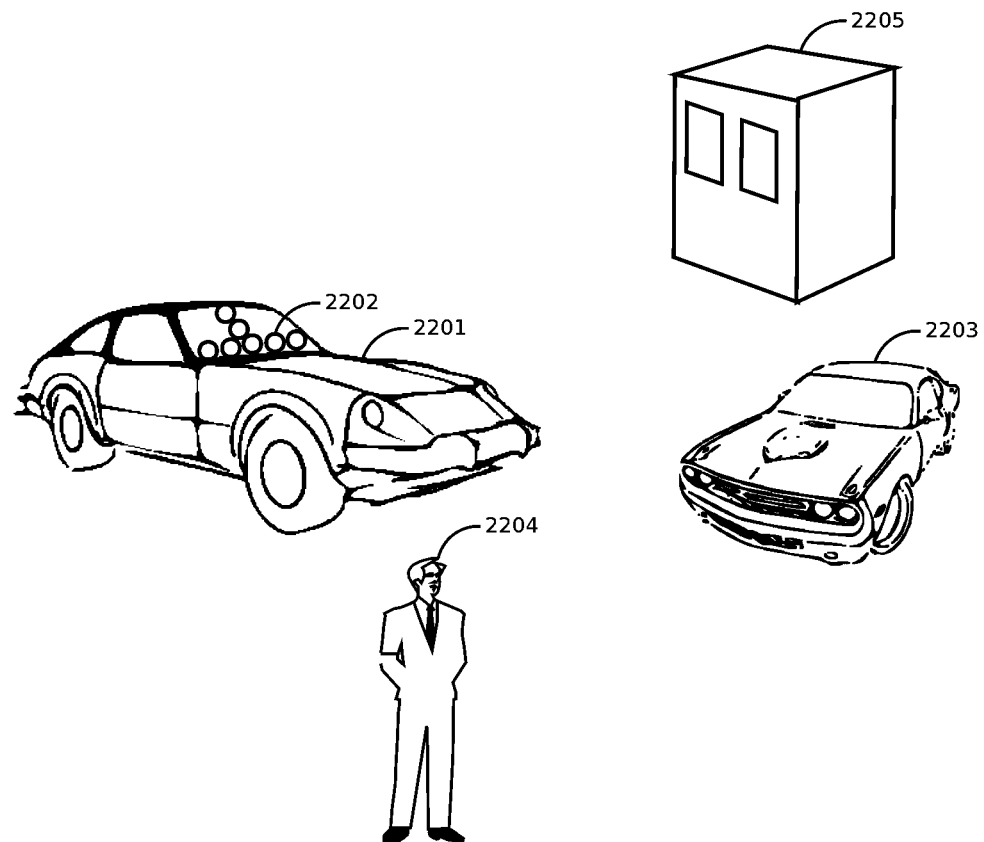
FIG. 20C is illustrative block diagram of an embodiment of an autonomous vehicle.

FIG. 20C is an illustrative block diagram of an embodiment of an autonomous vehicle. The vehicle 2201 is designed to drive completely autonomously, without intervention by a human driver, or is designed to offer assistive features to a human driver such as obstacle avoidance, automatic braking, and automatic parking. The vehicle 2201 includes a camera array 2202 that is configured in any of the ways described with respect to FIG. 12A-FIG. 12D or FIG. 18A-FIG. 18C. Using the method described with respect to FIG. 2, the vehicle 2201 creates three-dimensional object models of objects in the environment such as another vehicle 2203, a person 2204, and a building 2205. These object models are created with high accuracy and speed, which then allows accurate and consistent driving without the use of other types of imaging. This facilitates reducing the cost of the imaging system for the autonomous vehicle 2201. In some embodiments, more than one camera array 2202 may be used to provide redundancy or better visibility around the entire vehicle.

Figure 20D:
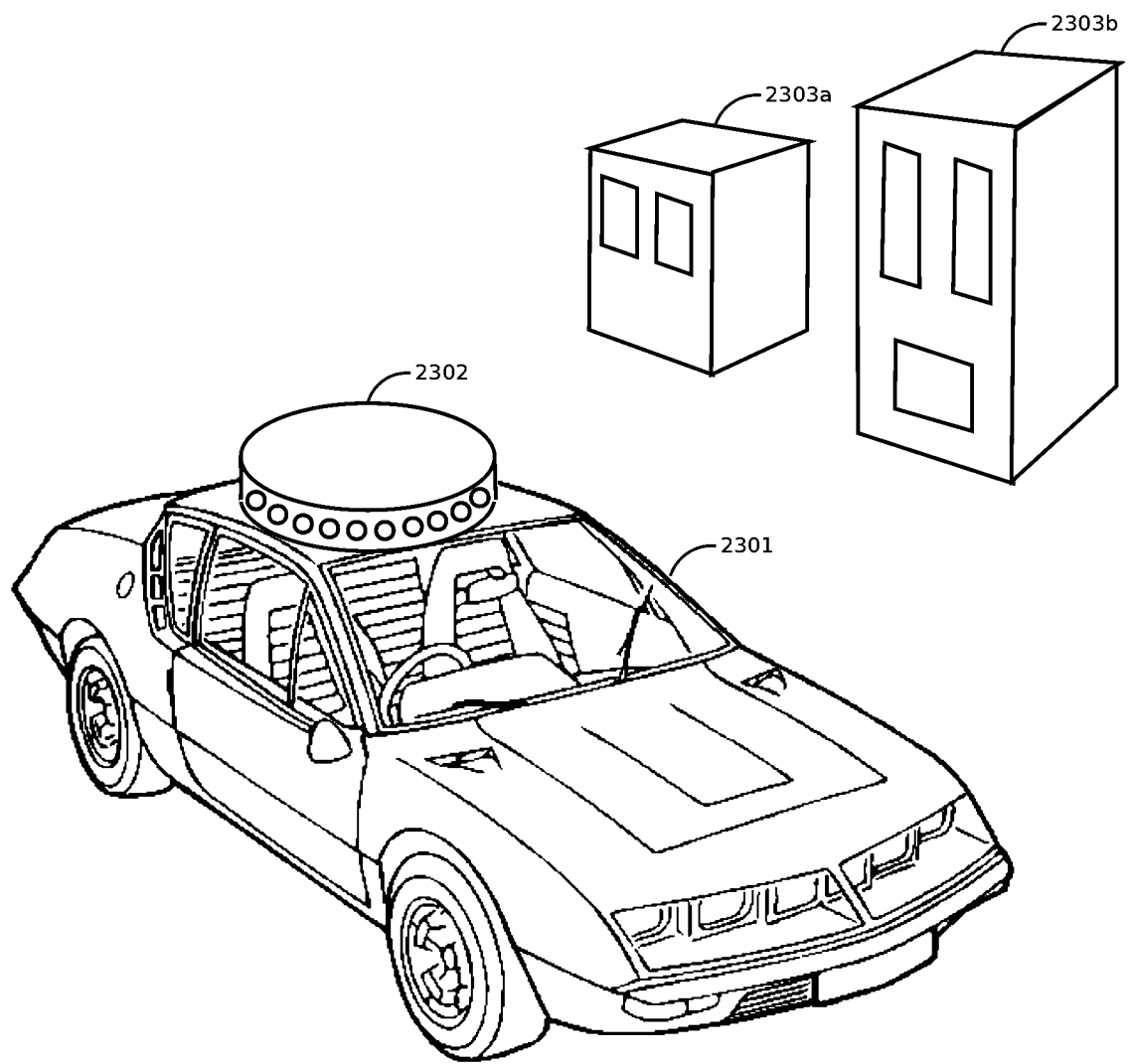
FIG. 20D is illustrative block diagram of an embodiment a mapping vehicle.

FIG. 20D is an illustrative block diagram of an embodiment of a mapping vehicle. The vehicle 2301 is used for gathering mapping information. It may be desirable to gather images of the surrounding scenery to use with the mapping information, as well as three-dimensional models of the surrounding buildings such as 2303a and 2303b. For example, this sort of imagery and three-dimensional modeling is used in the "Street View" system offered by Google, Inc. of Mountain View, Calif. The vehicle 2301 includes a 360-degree camera system 2302, which is a cylindrical camera as described with respect to FIG. 18A, with orthogonal imaging elements as described with respect to FIG. 18B. This camera system allows using the method described with respect to FIG. 2 to create accurate and reliable three-dimensional models of the surrounding environment such as buildings 2303a and 2303b. This camera system allows using the method described with respect to FIG. 15 to synthesize images from any camera angle and orientation, for use with the mapping system. The camera system facilitates reducing the overall cost of acquisition of mapping data, by replacing the use of other imaging systems such as light detection and ranging (LIDAR). The use of the method described with respect to FIG. 2 may create better three-dimensional models because they will include connectivity information of the points on the model, may be more accurate than the models created using other imaging systems such as LIDAR, and may be less sensitive to acquisition challenges such as cross-talk, interference, illumination, or weather conditions.

Figure 20E:
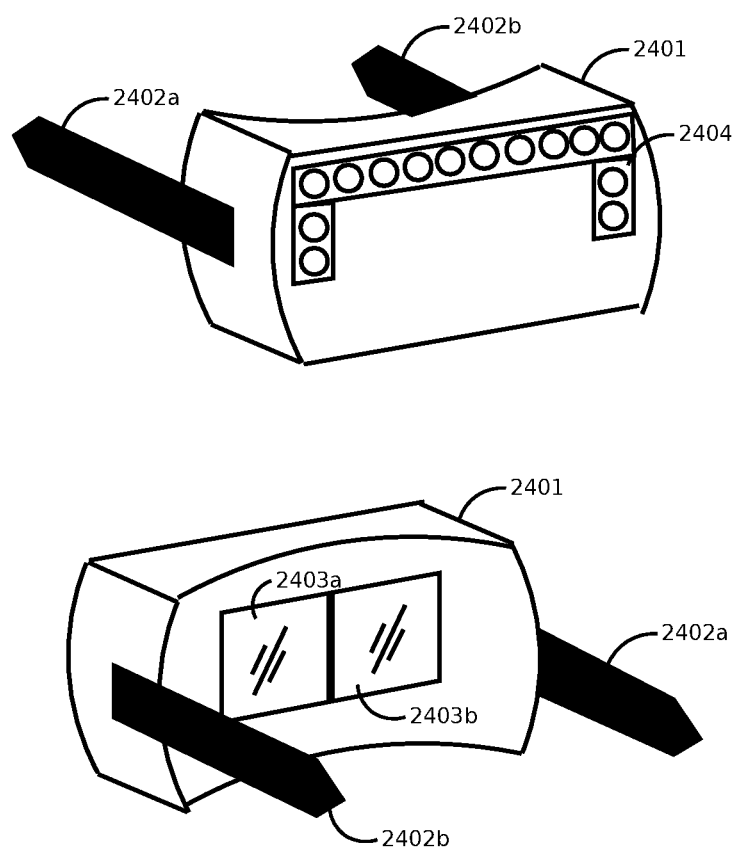
FIG. 20E is illustrative block diagram of two views of an embodiment of a virtual reality headset.

FIG. 20E is an illustrative block diagram of two views of an embodiment of a virtual reality headset. The headset 2401 is meant to be worn over the eyes using temple pieces or a fastening strap 2402a and 2402b. A display system 2403a and 2403b presents the virtual reality display to the user. The front side of the headset 2401, which faces away from the user, has a camera array 2404 on it. The camera array 2404 is configured in any of the ways described with respect to FIG. 12A-FIG. 12D or FIG. 18A-FIG. 18C. Using the method described with respect to FIG. 2, the system creating the display 2403a and 2403b creates three-dimensional object models of objects in the environment using images from the camera array 2404. The system uses these models to accurately track the motion of the user and the headset. The system uses these models to create objects in the virtual environment that correspond to objects in the real world, to allow the user to interact with the real world while wearing the headset. The system uses these models to create additional objects in the virtual world that accurately and smoothly interact with the objects that correspond to objects in the real world.

Various implementations are described herein, generally, as one or more processors, systems, servers, computers, circuits, software, memory, and/or combinations of these things. Generally speaking, any functions and/or processes described herein can be implemented in one or more of these forms. "Circuitry" can refer to dedicate logic gates, arranged so as to necessarily perform a certain function, or as general purpose circuitry (e.g., a processor, FPGA or other configurable circuits) that are controlled or configured by instructions to adapt that circuitry to perform a specific function. In the case of software or other instructional logic, the instructions are typically written or designed in a manner that has certain structure (architectural features) such that, when those instructions are ultimately executed, they cause the one or more general purpose circuits or hardware devices to necessarily perform certain described tasks. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine. The machine-readable media can be in standalone form (e.g., a program disk, whether bootable or executable or otherwise) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, in one implementation, instructions on non-transitory machine-readable media can be executed by a single computer and, in other cases as noted, can be stored and/or executed on a distributed basis, e.g., using one or more servers, web clients, or application-specific devices, whether collocated or remote from each other. Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices. Throughout this disclosure, various processes have been described, any of which can generally be implemented as instructional logic (e.g., as instructions stored on non-transitory machine-readable media), as hardware logic, or as a combination of these things.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

I claim:

1. A computer-implemented method comprising:
storing spatial images representing at least one object in memory;
using at least one processor to
create at least one epipolar plane image from two or more of the spatial images stored in memory,
identify a first line fit as corresponding to first edges from the at least one epipolar plane image,
identify a second line fit as corresponding to second edges from the at least one epipolar plane image,
associate the first line fit and the second line fit with respective first and second contours of the at least one object using one or more of the spatial images stored in memory, and
identify an intersection point between the first line fit and the second line fit,
identify an occlusion using the intersection point, and
create a three-dimensional representation of the at least one object with a first one of the first contour and the second contour occluding a second one of the first contour and the second contour dependent on the identified occlusion; and
storing the three-dimensional representation of the at least one object in memory.

2. The computer-implemented method of claim 1, wherein using the at least one processor to identify the occlusion comprises causing the at least one processor to identify the first contour as occluding the second contour dependent on identifying one of the first line fit and the second line fit which terminates at the intersection point.

3. The computer-implemented method of claim 1, wherein:
using the at least one processor to identify the first line fit as corresponding to the first edges and to associate the first line fit with the first contour comprises
identifying the first contour using the one or more spatial images stored in memory, the first contour representing a first single image feature that appears in two or more of the spatial images stored in memory,
selecting edges from the at least one epipolar plane image which map to the first contour for use as the first edges, and
ordering the edges selected for use as the first edges as a sequence in a manner representing progressive positions along the first contour; and
using the at least one processor to identify the second line fit as corresponding to the second edges and to associate the second line fit with the second contour comprises
identifying the second contour using the one or more spatial images stored in memory, the second contour representing a second single image feature that appears in two or more of the spatial images stored in memory, selecting edges from the at least one epipolar plane image which map to the second contour for use as the second edges, and ordering the edges selected for use as the second edges as a sequence in a manner representing progressive positions along the second contour.

4. The computer-implemented method of claim 1, wherein using the processor to create at least one epipolar plane image comprises:

for each of plural ones of the spatial images stored in memory, taking second derivatives of data appearing in the one of the spatial images stored in memory and interpolating zero crossings from the second derivatives; and for each epipolar plane image of the at least one epipolar plane image, arranging spatial domain data representing the interpolated zero crossings from the second derivatives according to a corresponding epipolar line.

5. The computer-implemented method of claim 4, wherein:

the computer-implemented method further comprises storing configuration data for each camera which sourced one of the two or more spatial images stored in memory; and the computer-implemented method comprises causing the at least one processor to identify each epipolar line used to generate an epipolar plane image in dependence on the configuration data.

6. The computer-implemented method of claim 1, wherein using the at least one processor to identify the occlusion comprises causing the at least one processor to estimate at the intersection point a depth associated with the first contour from at least one of epipolar plane image data or spatial image data and a depth associated with the second contour from at least one of epipolar plane image data or spatial image data, and selecting an occluded one of the contours dependent on estimated relative depth of the first contour and the second contour at the intersection point.

7. The computer-implemented method of claim 1, wherein using the at least one processor to identify the occlusion comprises identifying at least two slopes from the at least one epipolar plane image, and selecting an occluded one of the first contour and the second contour dependent on relative slope of the at least two slopes at the intersection point.

8. The computer-implemented method of claim 1, wherein the two or more of the spatial images used to generate the at least one epipolar plane image comprise at least three independent images in each of at least two independent dimensions, and wherein the computer-implemented method further comprises causing the at least one processor to identify edges in each dimension in each of the at least two independent dimensions.

9. The computer-implemented method of claim 1, wherein the computer-implemented method further comprises causing the at least one processor to perform a calibration of one or more cameras at two or more positions, to identify each camera of the one or more cameras in a coordinate reference system.

10. An apparatus comprising:

at least one processor;

memory to store spatial images representing at least one object; and instructions that when executed are to cause the at least one processor to create at least one epipolar plane image from two or more of the spatial images stored in the memory, identify a first line fit as corresponding to first edges from the at least one epipolar plane image, identify a second line fit as corresponding to second edges from the at least one epipolar plane image, associate the first line fit and the second line fit with respective first and second contours of the at least one object using one or more of the spatial images stored in the memory, and identify an intersection point between the first line fit and the second line fit, identify an occlusion using the intersection point, and create a three-dimensional representation of the at least one object with a first one of the first contour and the second contour occluding a second one of the first contour and the second contour dependent on the identified occlusion; and wherein said apparatus is further to store the three-dimensional representation of the at least one object in the memory.

11. The apparatus of claim 10, further comprising one or more cameras, wherein the at least one processor is to control the one or more cameras so as to capture the spatial images representing the at least one object and to store the spatial images representing the at least one object in the memory.

12. An apparatus to store in memory a three-dimensional representation of at least one object from spatial images representing the at least one object, the spatial images also being stored in memory, said apparatus comprising instructions stored on non-transitory machine-readable media, the instructions when executed to cause at least one processor to:

create at least one epipolar plane image from two or more of the spatial images stored in memory;

identify a first line fit as corresponding to first edges from the at least one epipolar plane image;

identify a second line fit as corresponding to second edges from the at least one epipolar plane image;

associate the first line fit and the second line fit with respective first and second contours of the at least one object using one or more of the spatial images stored in memory;

identify an intersection point between the first line fit and the second line fit;

identify an occlusion using the intersection point; and create the three-dimensional representation of the at least one object with a first one of the first contour and the second contour occluding a second one of the first contour and the second contour dependent on the identified occlusion.

13. The apparatus of claim 12, wherein said instructions when executed are to cause the at least one processor to identify the first contour as occluding the second contour dependent on identifying one of the first line fit and the second line fit which terminates at the intersection point.

14. The apparatus of claim 12, wherein said instructions when executed are to cause the at least one processor to:

identify the first contour using the one or more spatial images stored in memory, the first contour representing a first single image feature that appears in two or more of the spatial images stored in memory;

select edges from the at least one epipolar plane image which map to the first contour for use as the first edges;

order the edges selected for use as the first edges as a sequence in a manner representing progressive positions along the first contour;

identify the second contour using the one or more spatial images stored in memory, the second contour representing a second single image feature that appears in two or more of the spatial images stored in memory;

select edges from the at least one epipolar plane image which map to the second contour for use as the second edges; and order the edges selected for use as the second edges as a sequence in a manner representing progressive positions along the second contour.

15. The apparatus of claim 12, wherein said instructions when executed are to cause the at least one processor to:

for each of plural ones of the spatial images stored in memory, take second derivatives of data appearing in the one of the spatial images stored in memory and interpolating zero crossings from the second derivatives; and for each epipolar plane image of the at least one epipolar plane image, arrange spatial domain data representing the interpolated zero crossings from the second derivatives according to a corresponding epipolar line.

16. The apparatus of claim 15, wherein said instructions when executed are to cause the at least one processor to:

store configuration data which represents each camera which sourced one of the two or more spatial images stored in memory; and identify each epipolar line used to generate an epipolar plane image in dependence on the configuration data.

17. The apparatus of claim 12, wherein said instructions when executed are to cause the at least one processor to estimate at the intersection point a depth associated with the first contour from at least one of epipolar plane image data or spatial image data and a depth associated with the second contour from at least one of epipolar plane image data or spatial image data, and to select an occluded one of the contours dependent on estimated relative depth of the first contour and the second contour at the intersection point.

18. The apparatus of claim 12, wherein said instructions when executed are to cause the at least one processor to identify at least two slopes from the at least one epipolar plane image, and to select an occluded one of the first contour and the second contour dependent on relative slope of the at least two slopes at the intersection point.

19. The apparatus of claim 12, wherein the two or more of the spatial images used to generate the at least one epipolar plane image comprise at least three independent images in each of at least two independent dimensions, and wherein said instructions when executed are to cause the at least one processor to identify edges in each dimension in each of the at least two independent dimensions.

20. The apparatus of claim 12, wherein said instructions when executed are to cause the at least one processor to perform a calibration of one or more cameras at two or more positions, to identify each camera of the one or more cameras in a coordinate reference system.

* * * * *